(12) United States Patent
Amiri et al.

(10) Patent No.: US 10,972,582 B2
(45) Date of Patent: *Apr. 6, 2021

(54) SYSTEM AND METHOD FOR SCOPED ATTRIBUTES

(71) Applicant: General Electric Company, Schenectady, NY (US)

(72) Inventors: Dariush Amiri, San Ramon, CA (US); Sanjeev Chopra, Dublin, CA (US)

(73) Assignee: General Electric Company, Schenectady, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/420,390

(22) Filed: May 23, 2019

(65) Prior Publication Data

US 2019/0281137 A1 Sep. 12, 2019

Related U.S. Application Data

(63) Continuation of application No. 15/148,940, filed on May 6, 2016, now Pat. No. 10,306,016.

(60) Provisional application No. 62/289,842, filed on Feb. 1, 2016.

(51) Int. Cl.
*G06F 15/16* (2006.01)
*H04L 29/08* (2006.01)

(52) U.S. Cl.
CPC ............ *H04L 67/327* (2013.01); *H04L 67/02* (2013.01)

(58) Field of Classification Search
CPC ........................................ H04L 63/10
USPC ........................................................ 709/226
See application file for complete search history.

(56) References Cited

U.S. PATENT DOCUMENTS

| | | | |
|---|---|---|---|
| 8,196,125 | B2 | 6/2012 | Maes |
| 8,321,498 | B2 | 11/2012 | Maes |
| 8,438,636 | B2 | 5/2013 | Isaacs |
| 9,230,085 | B1 | 1/2016 | Paczkowski |
| 9,325,739 | B1 | 4/2016 | Roth |
| 9,571,495 | B2 | 2/2017 | Amiri |
| 9,923,905 | B2 | 3/2018 | Amiri |

(Continued)

OTHER PUBLICATIONS

U.S. Appl. No. 15/148,944, Notice of Allowance dated Jan. 3, 2018, 27 pgs.

(Continued)

*Primary Examiner* — Hamza N Algibhah
(74) *Attorney, Agent, or Firm* — Fitch, Even, Tabin & Flannery LLP

(57) ABSTRACT

In some example embodiments, a method includes storing a user attribute, a resource attribute of a resource of a web service, one or more scope conditions for applying one of attributes in generating a decision of whether to permit an action, and a script comprising an access control policy comprising one or more policy conditions to be satisfied in order to permit an action. A web service request may be received for accessing the resource. The scope condition(s) may be determined to be satisfied, and a decision to permit or deny the web service request may be generated based on the access control policy, with use of the stored attribute in generating the decision being based on the determination that the scope condition(s) are satisfied. Generating the decision may comprise interpreting the script. The decision may be transmitted to the web service.

19 Claims, 24 Drawing Sheets

(56) References Cited

U.S. PATENT DOCUMENTS

| | | | |
|---|---|---|---|
| 10,306,016 B2 | 5/2019 | Amiri | |
| 2003/0220925 A1 | 11/2003 | Lior | |
| 2008/0120691 A1 | 5/2008 | Flewallen | |
| 2009/0225763 A1 | 9/2009 | Forsberg | |
| 2010/0198730 A1 | 8/2010 | Ahmed | |
| 2011/0068935 A1* | 3/2011 | Riley | A61B 5/024 |
| | | | 340/575 |
| 2011/0231768 A1 | 9/2011 | Tovar | |
| 2012/0150912 A1* | 6/2012 | Ripberger | G06F 16/24573 |
| | | | 707/786 |
| 2014/0173687 A1 | 6/2014 | Dimitrakos | |
| 2015/0180863 A1 | 6/2015 | Kobayashi | |
| 2015/0220659 A1* | 8/2015 | Rissanen | G06F 21/6218 |
| | | | 707/759 |
| 2015/0295983 A1 | 10/2015 | Hu | |
| 2016/0004882 A1* | 1/2016 | Ballai | G06F 16/113 |
| | | | 726/30 |
| 2016/0072815 A1* | 3/2016 | Rieke | H04L 63/1433 |
| | | | 726/3 |
| 2016/0081134 A1* | 3/2016 | Chow | G06F 16/335 |
| | | | 455/419 |
| 2016/0088022 A1 | 3/2016 | Handa | |
| 2016/0269416 A1* | 9/2016 | Camenisch | H04L 63/065 |
| 2016/0292205 A1 | 10/2016 | Massey | |
| 2016/0373455 A1 | 12/2016 | Shokhrin | |
| 2017/0034201 A1* | 2/2017 | Zaw | H04L 63/102 |
| 2017/0111336 A1 | 4/2017 | Davis | |
| 2017/0134427 A1 | 5/2017 | Hutchins | |
| 2017/0163684 A1* | 6/2017 | Brucker | G06F 21/6218 |
| 2017/0223057 A1 | 8/2017 | Amiri | |
| 2017/0289271 A1 | 10/2017 | Seed | |
| 2017/0373919 A1* | 12/2017 | Li | H04L 69/324 |

OTHER PUBLICATIONS insight.tech, "Gateways for the Industrial IoT Ease the Integration Pain", Nov. 3, 2015, <https://www.insight.tech/industrial/gateways-for-the-industrial-iot-ease-the-integration-pain>, 5 pages. (Year: 2015).

* cited by examiner

| ACTION | REQUIRED SCOPE IN ZAC UAA | SAMPLE REQUEST TO ZAC | RESPONSE |
|---|---|---|---|
| Authorize request for a Zone.<br><br>1. apm invokes asset<br>2. asset invokes ZAC authorization | \<serviceId\>.zones.read scope.<br><br>example: asset.zones.read | POST /v1/authorization/asset/asset-pgs<br><br>Authorization: Bearer \<token with scope asset.zones.read\><br><br>....<br>{ "encodedToken": "token with scope asset.zones.3c189ce5-74c0-4195-acc2-db3b7cac6eba.user"<br>} | HTTP status 200:<br>{<br>"decodedToken": {<br>"iss": "https://apm.uaa.com",<br>"sub": " ",<br>"exp": 1437614351,<br>"iat": 1437610751,<br>"scope":<br>"asset.zones.3c189ce5-74c0-4195-acc2-db3b7cac6eba.user"<br>},<br>"decision": "PERMIT"<br>}<br>or<br>HTTP status 200:<br>{<br>"decodedToken": {<br>"iss": "https://apm.uaa.com/",<br>"sub": " ",<br>"exp": 1437614351,<br>"iat": 1437610751,<br>"scope": "asset.zones.\<asset-tenant2 guid\>.user"<br>},<br>"decision": "DENY"<br>}<br>or<br>HTTP status 403: {"error:" "unauthorized" } |

*FIG. 17*

ZONE MANAGEMENT

| ACTION | REQUIRED SCOPE IN ZAC UAA | SAMPLE REQUEST TO ZAC | RESPONSE |
|---|---|---|---|
| Create/Update service instance registration<br>- apm dev. cf create-service asset-pgs -c '{"trustedIssuerIds": ["https://sample-uaa.ge.com/oauth/token"]}'<br>- asset service broker - PUT to ZAC | - <serviceId>.zones.write scope.<br>- example: asset.zones.write | PUT /v1/registration/asset/asset-pgs<br>...<br>{"trustedIssuerIds": ["https://sampleuaa.ge.com/oauth/token"]} | 201 - when registration is new and was created.<br>200 - when registration already exists and was updated. |
| GET service instance registration | <serviceId>.zones.read scope.<br>example: scope: asset.zones.read | GET /v1/registration/asset/asset-pgs | {"trustedIssuerIds": ["https://sampleuaa.ge.com/oauth/token"]} |
| DELETE service instance registration | <serviceId>.zones.write scope.<br>example: apm.zones.write | DELETE /v1/registration/asset/asset-pgs | 204 NO CONTENT |

*FIG. 18*

```
cf cs asset asset-plan asset-pgs -c
'{"trustedIssuerIds":["https://apm2.uaa.com/oauth/to
ken"]}'
```

*FIG. 19*

```
credentials: {
    "uri": "http://predix-asset-rc-ga.grc-apps.svc.ice.ge.com",
    "zone": {
        "http-header-name": "Predix-Zone-Id",
        "http-header-value": "9378e3db-e683-46a2-97c2-ccd11d75869d",
        "oauth-scope" : "asset.zones.9378e3db-e683-46a2-97c2-ccd11d75869d.user"
    }
}
```

*FIG. 20*

```
<dependency>
    <groupId>com.ge.predix</groupId>
    <artifactId>uaa-token-lib</artifactId>
    <version>2.0.0-SNAPSHOT</version>
</dependency>
```

*FIG. 21*

| PROPERTY | DESCRIPTION | DEFAULT VALUE |
|---|---|---|
| serviceId | The name of the service registered to ZAC for zone authorization | (required) |
| zacUrl | ZAC url where trusted issuers are registered for this service | (required) |
| defaultTrustedIssuerId | Issuer Id to validate for requests not specific to a zone (no zone header) | (required) |
| issuersTtlSeconds | The number of seconds before re-fetching trusted issuers from ZAC | 86400 seconds (1 day) |
| storeClaims | Determines if claims in token are copied to the Spring Authentication object | false |

*FIG. 22*

```xml
<!-- Register zacTokenService to spring security -->
    <oauth:resource-server id="oauth2remoteTokenFilter"
token-services-ref="zacTokenService" />
    <custom-filter ref="oauth2remoteTokenFilter" position="PRE_AUTH_FILTER" />

<bean id="zacRestTemplate"
        class="org.springframework.security.oauth2.client.OAuth2RestTemplate">
        <constructor-arg>
            <bean
class="org.springframework.security.oauth2.client.token.grant.client.ClientCredentialsResourceDetails">
                <property name="accessTokenUri" value="${ZAC_UAA_TOKENURL}" />
                <property name="clientId" value="${zac.client.id}" />
                <property name="clientSecret" value="${zac.client.secret}" />
            </bean>
        </constructor-arg>
    </bean>

<!-- configure zacTokenService -->
    <bean id="zacTokenService" class="com.ge.predix.uaa.token.lib.ZacTokenService">
        <property name="serviceId" value="predix-asset" />
        <property name="storeClaims" value="true" />
        <property name="zacUrl"
value="https://zac-release-candidate.grc-apps.svc.ice.ge.com" />
        <property name="defaultTrustedIssuerId"
value="https://someuaa.com/oauth/token" />
        <property name="oauth2RestTemplate" ref="zacRestTemplate" />
    </bean>
```

*FIG. 23*

```
...
import com.ge.predix.uaa.token.lib.ZoneOAuth2Authentication;

@Override
  public String getZoneEntityOrFail() {
      Authentication authentication =
SecurityContextHolder.getContext().getAuthentication();
      if
(!ZoneOAuth2Authentication.class.isAssignableFrom(authentication.getClass())) {
          throw new InvalidServiceRequestException("Unexpected Error:
SecurityContext must have an Authentication object of type:
ZoneOAuth2Authentication.");
      }
      ZoneOAuth2Authentication zoneAuth = (ZoneOAuth2Authentication)
authentication;
      final String zoneId = zoneAuth.getZoneId();
      if (null == zoneId || zoneId.isEmpty()) {
          throw new InvalidACSRequestException("Zone identifier is missing in
service request.");
      }
      return zoneId;
  }
```

*FIG. 24*

```
{
  "name" : "Operator policy set",
  "policies" : [
    {
      "name" : "Operators can read a site if they are assigned to the site.",
      "target" : {
        "name" : "When an operator reads a site",
        "resource" : {
          "name" : "Site",
          "uriTemplate" : "/sites/{site_id}"
        },
        "action" : "GET",
        "subject" : {
          "name" : "Operator",
          "attributes" : [
            { "issuer" : "http://cp.mcafee.com/d/k-Kr6hESyM-MqehRS63hOrKrhKOUCZtZcQsCQrIK9Lnv7c6QrIK9LnvpKrhKNtddUQsKcCN4DI9k9wGxVyiTbCW7C9bsKrhvshd791N_HYyMyMyyNRXBQjhOONOrP3bUVZDG8FHnjIKCPOEuvkzaT0QSyrsdTdTdAVPmEBCrqDresp46V_iFgCq8zuGOz854vVsSNtx5AS2_id40mSvMCq811polJDal3h0qa12RLFgQg2lojzkYQg37NcOJU8d40NqGTE6y0gDecy3s_E23h1l43h01douq812RLFgQg2lojzkYQkCPhOyrqUmFY617,
              "name" : "site" }
          ]
        }
      },
      "conditions" : [
        { "name" : "is assigned to site",
          "condition" : "match.single(subject.attributes('http://cp.mcafee.com/d/1jWVIg410i4zqb3X1EV7nood79KVJ6XbyrRTQPhOrhKOUCZtYsMrhKOUCZtZCVJ6X5QQTzhOUOr4iuMBgC2G7C9bsKrEuoAJOVJ5ZN4QsA77-LOb2b2bWb7nKnhd7bb79LccLzDSuEyCJtdmWrfaxVZicHs3jqpJMTsTsSjDdqympJGtIVNAgrDZeB2pEDdWHacwkh_BPr5S4mjobZ8Qg1rp_2pEw45BzVmSsGMd41EE4bm-B3h09IxedjPh0cv4PaTwwQg35GHuwq812sUO8dPw8d46Mgd404RxVEw4bm-B3h09IxedjPhird7a9ICaK7B9-23TB, 'site'), resource.uri.placeHolder('site_id'))" }
      ],
      "effect" : "PERMIT"
    }
  ]
}
```

FIG. 25

SYSTEM AND METHOD FOR SCOPED ATTRIBUTES

CROSS-REFERENCE TO RELATED APPLICATIONS

This application is a continuation of U.S. patent application Ser. No. 15/148,940, filed May 6, 2016, which claims the benefit of U.S. Provisional Application No. 62/289,842, filed Feb. 1, 2016, which are hereby incorporated by reference in their entireties.

TECHNICAL FIELD

The present application relates generally to the technical field of data processing, and, in various embodiments, to a system and method for scoped attributes.

BACKGROUND

Administrators of web services lack the ability to easily and efficiently change access control policies of the web services without having to directly alter their application runtime or configuration. Current solutions for writing access control policies have a steep learning curve and an unintuitive format for writing policies, leading to inefficient and, in some cases, insecure, access control policies. Proper configuration of security components is often one of the weakest points of any security technology. Due to the complexity of many current solutions, it is not uncommon to find code that is rife with poorly implemented, or even ineffective, configuration.

BRIEF DESCRIPTION

Some or all of the above needs or problems may be addressed by one or more example embodiments. Example embodiments of a system and method for scoped attributes are disclosed.

In one example embodiment, a computer-implemented method comprises storing, in one or more data stores, a user attribute of a user, a resource attribute of a resource of a web service, one or more scope conditions to be satisfied in order to apply one of the user attribute and the resource attribute in generating a decision of whether to permit or deny an action, and a script comprising an access control policy for accessing the resource of the web service, with the user attribute comprising user information about the user other than an identification of the user, the resource attribute comprising resource information about the resource other than an identification of the resource, and the access control policy comprising one or more policy conditions to be satisfied in order to permit the action. In some example embodiments, the one or more policy conditions comprise at least one of the user attribute and the resource attribute. In some example embodiments, the method further comprises receiving a web service request for accessing the resource of the web service, with the web service request corresponding to the user and comprising an access token for the user, action data identifying the action being requested to be applied to the resource, and resource data identifying the resource. In some example embodiment, the method further comprises determining that the one or more scope conditions are satisfied for the web service request, and generating a decision to either permit or deny the web service request based on the access control policy, with the use of the one of the stored user attribute and the stored resource attribute in generating the decision being based on the determination that the one or more scope conditions are satisfied. In some example embodiments, the generating of the decision comprises interpreting the script. In some example embodiments, the method further comprises transmitting the decision to the web service.

The above and other features, including various novel details of implementation and combination of events, will now be more particularly described with reference to the accompanying figures and pointed out in the claims. It will be understood that the particular techniques, methods, and other features described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIGS. 17 and 18 illustrate tables of actions that can be performed by the zone access control system, including corresponding sample requests and responses to the requests, in accordance with some example embodiments;

FIG. 19 is sample pseudocode for service brokers to accept a named parameter with a collection of issuer ids for all user account and authorization system issuer identifications trusted by that instance, in accordance with some example embodiments;

FIG. 20 is sample pseudocode illustrating a credentials field for a service instance binding response, in accordance with some example embodiments;

FIG. 21 is sample pseudocode for a dependency, in accordance with some example embodiments;

FIG. 22 illustrates a spring security configuration, in accordance with some example embodiments;

FIG. 23 is sample pseudocode for registering a token service, in accordance with some example embodiments;

FIG. 24 is sample pseudocode for accessing a zone, in accordance with some example embodiments;

FIG. 25 illustrates another access control policy within a script, in accordance with some example embodiments;

Figure 1:
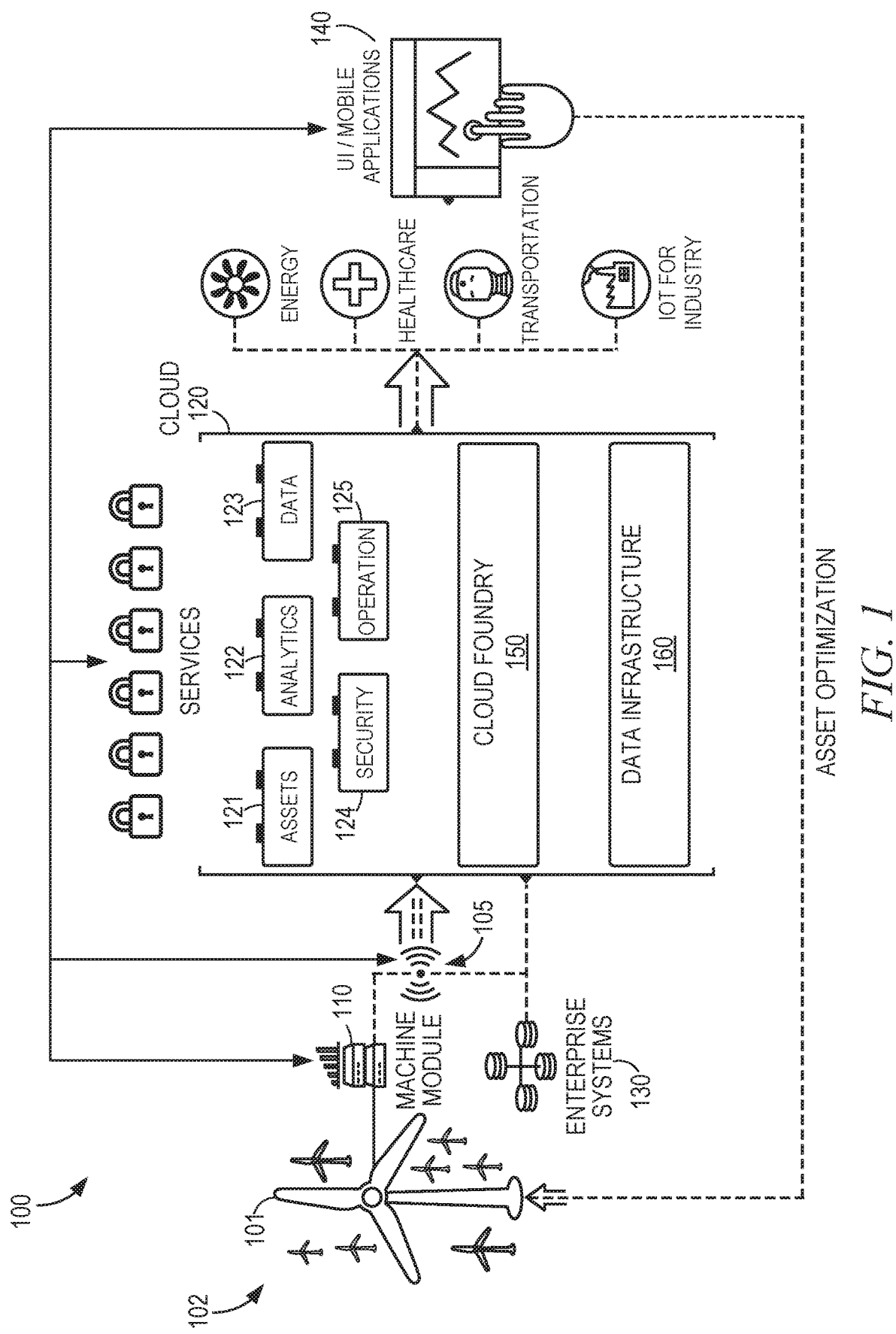
FIG. 1 illustrates an asset performance management platform (APM), in accordance with some example embodiments.

The figures are not necessarily drawn to scale, and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Example systems and methods of scoped attributes are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a computer-implemented method comprises storing, in one or more data stores, a user attribute of a user, a resource attribute of a resource of a web service, one or more scope conditions to be satisfied in order to apply one of the user attribute and the resource attribute in generating a decision of whether to permit or deny an action, and a script comprising an access control policy for accessing the resource of the web service, with the user attribute comprising user information about the user other than an identification of the user, the resource attribute comprising resource information about the resource other than an identification of the resource, and the access control policy comprising one or more policy conditions to be satisfied in order to permit the action. In some example embodiments, the one or more policy conditions comprise at least one of the user attribute and the resource attribute. In some example embodiments, the method further comprises receiving a web service request for accessing the resource of the web service, with the web service request corresponding to the user and comprising an access token for the user, action data identifying the action being requested to be applied to the resource, and resource data identifying the resource. In some example embodiment, the method further comprises determining that the one or more scope conditions are satisfied for the web service request, and generating a decision to either permit or deny the web service request based on the access control policy, with the use of the one of the stored user attribute and the stored resource attribute in generating the decision being based on the determination that the one or more scope conditions are satisfied. In some example embodiments, the generating of the decision comprises interpreting the script. In some example embodiments, the method further comprises transmitting the decision to the web service.

In some example embodiments, the one of the user attribute and the resource attribute comprises the user attribute, the one or more scope conditions comprises a restriction that the user attribute be associated with the user in generating the decision of whether to permit or deny the action only when the action involves one of a set of one or more particular resources, and the determining that the one or more scope conditions are satisfied for the web service request comprises determining that the resource of the web service request is one of the set of one or more particular resources.

In some example embodiments, the one or more scope conditions are stored in a relationship with the one of the user attribute and the resource attribute in a graph data structure.

In some example embodiments, the web service comprises a representational state transfer (RESTful) application programming interface (API).

In some example embodiments, the script is included within a JavaScript Object Notation (JSON).

In some example embodiments, transmitting the decision to the web service further comprises transmitting the stored user attribute and the stored resource attribute to the web service.

In some example embodiments, the action comprises a HyperText Transfer Protocol (HTTP) method.

In some example embodiments, the resource data comprises a uniform resource identifier (URI) corresponding to the resource.

In some example embodiments, the user attribute comprises an organization to which the user belongs, a group to which the user belongs, or a role of the user.

In some example embodiments, the resource attribute comprises an organization associated with the resource, a group associated with the resource, or a role associated with the resource.

In some example embodiments, the web service comprises a service in an Industrial Internet of Things (IIoT).

In some example embodiments, the generating the decision to either permit or deny the web service request comprises retrieving the user attribute and the resource attribute from the attribute data store based on the web service request, determining whether the one or more policy conditions of the access control policy are satisfied based on the retrieved user attribute, the retrieved resource attribute, and the web service request, and generating the decision to either permit or deny the web service request based on the determination of whether the one or more policy conditions of the access control policy are satisfied. In some example embodiments, the retrieving the user attribute from the attribute data store comprises extracting the user attribute based on the access token for the user.

In some example embodiments, the method further comprises modifying the script in response to a user input, with the modification of the script comprising a policy modification of the access control policy, and storing the modified script in the policy data store. In some example embodiments, the generating the decision to either permit or deny the web service request comprises generating the decision to either permit or deny the web service request based on the modified access control policy, the retrieved user attribute, and the retrieved resource attribute, with the generating of the decision comprising interpreting the modified script.

Alternative embodiments other than the embodiments discussed above are also within the scope of the present disclosure, some examples of which are also provided in the present disclosure.

Some technical effects of the system and method of the present disclosure are to enable application developers to add granular authorization mechanisms to access web applications and services without having to add complex authorization logic to their code. Additionally, other technical effects will be apparent from this disclosure as well.

The methods or embodiments disclosed herein may be implemented as a computer system having one or more modules (e.g., hardware modules or software modules). Such modules may be executed by one or more processors of the computer system. In some embodiments, a non-transitory machine-readable storage device can store a set of instructions that, when executed by at least one processor, causes the at least one processor to perform the operations and method steps discussed within the present disclosure.

In the description below, for purposes of explanation only, specific nomenclature is set forth to provide a thorough understanding of the present disclosure. However, it will be apparent to one skilled in the art that these specific details are not required to practice the teachings of the present disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

The systems and methods for access control services disclosed herein can include or can be a portion of an Industrial Internet of Things (IIoT). The traditional Internet of Things (IoT) involves the connection of various consumer devices, such as coffee pots and alarm clocks, to the Internet to allow for various levels of control and automation of those devices. The Industrial Internet of Things (IIoT), on the other hand, involves connecting industrial equipment or other assets as opposed to consumer devices. Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often takes into account both the physics of the task at hand, as well as the environment in which such assets are configured to operate.

Low-level software and hardware-based controllers have long been used to drive industrial assets. However, with the rise of inexpensive cloud computing, increasing sensor capabilities, and decreasing sensor costs, as well as the proliferation of mobile technologies, there are new opportunities to enhance the business value of some industrial assets.

While progress with industrial equipment automation has been made over the last several decades, and assets have become 'smarter,' the intelligence of any individual asset pales in comparison to intelligence that can be gained when multiple smart devices are connected together. Aggregating data collected from or about multiple assets can enable users to improve business processes, for example by improving effectiveness of asset maintenance or improving operational performance.

In an example, an industrial asset can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications can be constructed, and new physics-based analytics can be created. Insights gained through analysis of such data can lead to enhanced asset designs, or to enhanced software algorithms for operating the same or similar asset at its edge, that is, at the extremes of its expected or available operating conditions.

In an example, information about industrial assets and their use conditions, such as gathered from sensors embedded at or near industrial assets themselves, can be aggregated, analyzed, and processed in software residing locally or remotely from the assets. In an example, applications configured to operate at a local or remote processor can be provided to optimize an industrial asset for operation in a business context. In an example, a development platform can be provided to enable end-users to develop their own applications for interfacing with and optimizing industrial assets and relationships between various industrial assets and the cloud. Such end-user-developed applications can operate the device, fleet, enterprise, or global level by leveraging cloud or distributed computing resources.

The systems and methods for managing industrial assets can include or can be a portion of an IIoT. In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets.

In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function, as further described herein.

In an example, a manufacturer of industrial assets can be uniquely situated to leverage its understanding of industrial assets themselves, models of such assets, and industrial operations or applications of such assets, to create new value for industrial customers through asset insights. In an example, an asset management platform (AMP) can incorporate a manufacturer's asset knowledge with a set of development tools and best practices that enables asset users to bridge gaps between software and operations to enhance capabilities, and foster innovation.

In an example, an AMP includes a device gateway that is configured to connect multiple industrial assets to a cloud computing system. The device gateway can connect assets of a particular type, source, or vintage, or the device gateway can connect assets of multiple different types, sources, or vintages. In an example, the multiple connected assets can belong to different asset communities (e.g., notional groups of assets that are assigned by the end user and/or by the AMP), and the asset communities can be located remotely or locally to one another. The multiple connected assets can be in use (or non-use) under similar or dissimilar environmental conditions, or can have one or more other common or distinguishing characteristics. In an example, information about environmental or operating conditions of an asset or an asset community can be shared with the AMP. Using the AMP, operational models of one or more assets can be improved and subsequently leveraged to optimize assets in the same community or in a different community.

FIG. 1 illustrates generally an example of portions of a first asset management platform (herein, "AMP") 100. As further described herein, one or more portions of an AMP can reside in an asset cloud computing system 120, in a local or sandboxed environment, or can be distributed across multiple locations or devices. An AMP can be configured to perform any one or more of data acquisition, data analysis, or data exchange with local or remote assets, or with other task-specific processing devices.

The first AMP 100 includes a first asset community 102 that is communicatively coupled with the asset cloud computing system 120. In an example, a machine module 110 receives information from, or senses information about, at least one asset member of the first asset community 102, and configures the received information for exchange with the asset cloud computing system 120. In an example, the machine module 110 is coupled to the asset cloud computing system 120 or to an enterprise computing system 130 via a communication gateway 105. In an example, the communication gateway 105 includes or uses a wired or wireless communication channel that extends at least from the machine module 110 to the asset cloud computing system 120.

The asset cloud computing system 120 includes several layers. In an example, the asset cloud computing system 120 includes at least a data infrastructure layer 160, a cloud foundry layer 150, and modules for providing various functions. In the example of FIG. 1, the asset cloud computing system 120 includes an asset module 121, an analytics module 122, a data acquisition module 123, a data security module 124, and an operations module 125. Each of the modules 121-125 includes or uses a dedicated circuit, or instructions for operating a general purpose processor circuit, to perform the respective functions. In an example, the modules 121-125 are communicatively coupled in the asset cloud computing system 120 such that information from one module can be shared with another. In an example, the modules 121-125 are co-located at a designated datacenter or other facility, or the modules 121-125 can be distributed across multiple different locations.

An interface device 140 can be configured for data communication with one or more of the machine module 110, the gateway 105, or the asset cloud computing system 120. The interface device 140 can be used to monitor or control one or more assets. In an example, information about the first asset community 102 is presented to an operator at the interface device 140. The information about the first asset community 102 can include information from the machine module 110, or the information can include information from the asset cloud computing system 120. In an example, the information from the asset cloud computing system 120 includes information about the first asset community 102 in the context of multiple other similar or dissimilar assets, and the interface device 140 can include options for optimizing one or more members of the first asset community 102 based on analytics performed at the asset cloud computing system 120.

In an example, an operator selects a parameter update for the first wind turbine 101 using the interface device 140, and the parameter update is pushed to the first wind turbine via one or more of the asset cloud computing system 120, the gateway 105, and the machine module 110. In an example, the interface device 140 is in data communication with the enterprise computing system 130 and the interface device 140 provides an operation with enterprise-wide data about the first asset community 102 in the context of other business or process data. For example, choices with respect to asset optimization can be presented to an operator in the context of available or forecasted raw material supplies or fuel costs. In an example, choices with respect to asset optimization can be presented to an operator in the context of a process flow to identify how efficiency gains or losses at one asset can impact other assets. In an example, one or more choices described herein as being presented to a user or operator can alternatively be made automatically by a processor circuit according to earlier-specified or programmed operational parameters. In an example, the processor circuit can be located at one or more of the interface device 140, the asset cloud computing system 120, the enterprise computing system 130, or elsewhere.

Returning again to the example of FIG. 1, and several other figures described herein, some capabilities of the first AMP 100 are illustrated. The example of FIG. 1 includes the first asset community 102 with multiple wind turbine assets, including the first wind turbine 101. Wind turbines are used in some examples herein as non-limiting examples of a type of industrial asset that can be a part of, or in data communication with, the first AMP 100.

In an example, the multiple turbine members of the asset community 102 include assets from different manufacturers or vintages. The multiple turbine members of the asset community 102 can belong to one or more different asset communities, and the asset communities can be located locally or remotely from one another. For example, the members of the asset community 102 can be co-located on a single wind farm, or the members can be geographically distributed across multiple different farms. In an example, the multiple turbine members of the asset community 102 can be in use (or non-use) under similar or dissimilar environmental conditions, or can have one or more other common or distinguishing characteristics.

FIG. 1 further includes the device gateway 105 configured to couple the first asset community 102 to the asset cloud computing system 120. The device gateway 105 can further couple the asset cloud computing system 120 to one or more other assets or asset communities, to the enterprise computing system 130, or to one or more other devices. The first AMP 100 thus represents a scalable industrial solution that extends from a physical or virtual asset (e.g., the first wind turbine 101) to a remote asset cloud computing system 120. The asset cloud computing system 120 optionally includes a local, system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 124 in the asset cloud computing system 120. In an example, an external sensor can be used to sense information about a function of an asset, or to sense information about an environment condition at or near an asset. The external sensor can be configured for data communication with the device gateway 105 and the data acquisition module 124, and the asset cloud computing system 120 can be configured to use the sensor information in its analysis of one or more assets, such as using the analytics module 122.

In an example, the first AMP 100 can use the asset cloud computing system 120 to retrieve an operational model for the first wind turbine 101, such as using the asset module 121. The model can be stored locally in the asset cloud computing system 120, or the model can be stored at the enterprise computing system 130, or the model can be stored elsewhere. The asset cloud computing system 120 can use the analytics module 122 to apply information received about the first wind turbine 101 or its operating conditions (e.g., received via the device gateway 105) to or with the retrieved operational model. Using a result from the analytics module 122, the operational model can optionally be updated, such as for subsequent use in optimizing the first wind turbine 101 or one or more other assets, such as one or more assets in the same or different asset community. For example, information about the first wind turbine 101 can be analyzed at the asset cloud computing system 120 to inform selection of an operating parameter for a remotely located second wind turbine that belongs to a different second asset community.

The first AMP 100 includes a machine module 110. The machine module 110 includes a software layer configured for communication with one or more industrial assets and the asset cloud computing system 120. In an example, the machine module 110 can be configured to run an application locally at an asset, such as at the first wind turbine 101. The machine module 110 can be configured for use with or installed on gateways, industrial controllers, sensors, and other components. In an example, the machine module 110 includes a hardware circuit with a processor that is configured to execute software instructions to receive information about an asset, optionally process or apply the received information, and then selectively transmit the same or different information to the asset cloud computing system 120.

In an example, an AMP can be configured to aid in optimizing operations or preparing or executing predictive maintenance for industrial assets. An AMP can leverage multiple platform components to predict problem conditions and conduct preventative maintenance, thereby reducing unplanned downtimes. In an example, the machine module 110 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 110 or at the asset cloud computing system 120.

In response to the detected error conditions, the AMP can issue various mitigating commands to the asset, such as via the machine module 110, for manual or automatic implementation at the asset. In an example, the AMP can provide a shut-down command to the asset in response to a detected error condition. Shutting down an asset before an error condition becomes fatal can help to mitigate potential losses or to reduce damage to the asset or its surroundings. In addition to such an edge-level application, the machine module 110 can communicate asset information to the asset cloud computing system 120.

In an example, the asset cloud computing system 120 can store or retrieve operational data for multiple similar assets. Over time, data scientists or machine learning can identify patterns and, based on the patterns, can create improved physics-based analytical models for identifying or mitigating issues at a particular asset or asset type. The improved analytics can be pushed back to all or a subset of the assets, such as via multiple respective machine modules 110, to effectively and efficiently improve performance of designated (e.g., similarly-situated) assets.

In an example, the asset cloud computing system 120 can include the operations module 125. The operations module 125 can include services that developers can use to build or test Industrial Internet applications, or the operations module 125 can include services to implement Industrial Internet applications, such as in coordination with one or more other AMP modules. In an example, the operations module 125 includes a microservices marketplace where developers can publish their services and/or retrieve services from third parties. The operations module 125 can include a development framework for communicating with various available services or modules. The development framework can offer developers a consistent look and feel and a contextual user experience in web or mobile applications. Examples of various development modules are discussed below at FIGS. 8-12.

In an example, an AMP can further include a connectivity module. The connectivity module can optionally be used where a direct connection to the cloud is unavailable. For example, a connectivity module can be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 105 between the machine module 110 and the asset cloud computing system 120.

Figure 2:
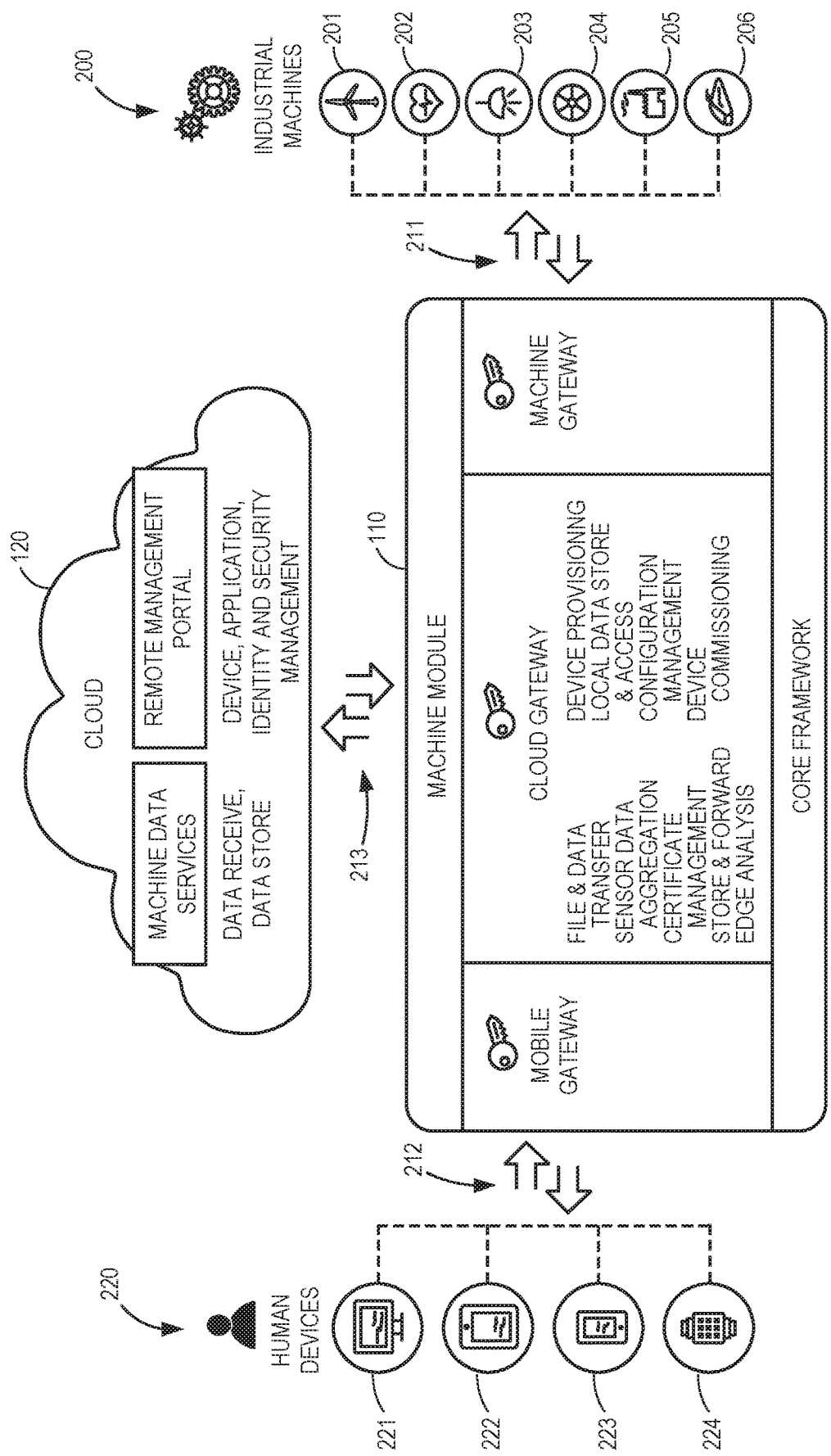
FIG. 2 illustrates a relationship between a machine module and an asset cloud computing system in an asset management platform, in accordance with some example embodiments.

FIG. 2 illustrates generally a relationship between the machine module 110 and the asset cloud computing system 120. In an example, the illustration represents a global virtual network that enables fast, secure connectivity between various distributed machine modules 110 and the asset cloud computing system 120. The machine module 110 can be configured to provide secure, bi-directional connectivity between the asset cloud computing system 120 and one or more industrial assets 200. The machine module 110 can further be configured to enable various analytical or operational applications or services to operate at the edge of the Industrial Internet. In this manner, the machine module 110 can facilitate near-real-time control of industrial assets based on services provided at or in coordination with the asset cloud computing system 120.

The machine module 110 can include a software stack that can be embedded into devices such as industrial control systems or network gateways. Such a software stack can be available in multiple form factors and can optionally be shipped with its own software development kit or SDK. The SDK can include functions that enable developers to leverage some or all of the machine module 110 features described below.

In an example, the machine module 110 is configured to provide security, authentication, and governance services for endpoint devices or assets. Security profiles applied by the machine module 110 can be audited and managed centrally for multiple devices that can be coupled to the machine module 110. This arrangement can ensure that the assets are connected, controlled, and managed in a safe and secure manner and that critical data is protected. In an example, the machine module 110 is configured to negotiate a secure connection with the asset cloud computing system 120 using the security module 124.

The machine module 110 can be coupled with one or more industrial assets 200. In the example of FIG. 2, the industrial assets 200 include aviation assets 201 (e.g., jet engines, control systems, etc.), healthcare assets 202 (e.g., imaging systems, patient record management systems, patient sensor or treatment devices, etc.), illumination assets 203 (e.g., illumination devices or systems, etc.), energy assets 204 (e.g., power generation systems, etc.), manufacturing or automation assets 205 (e.g., robots, etc.), or transportation assets 206 (e.g., locomotives, etc.), among others. The various industrial assets 200 can be coupled with the machine module 110 via one or more wired or wireless communication protocols 211. In an example, the protocols 211 include but are not limited to industrial protocols such as OPC-UA or ModBus. In an example, the protocols 211 provide an extensible plug-in framework that enables out-of-the-box connectivity to new assets based on the most common industrial platforms.

The machine module 110 can be coupled with various interface devices 220 via one or more wired or wireless communication protocols 212. The interface devices 220 can include, among other things, an asset-based computer terminal 221 that is integrated with or adjacent to an asset, a table computer 222, a mobile device 223 such as a smart phone or other multi-function electronic device, or a wearable device 224, such as a smart watch. In an example, sensor data from an asset is received at an application provided at the machine module 110. The application can be configured to analyze, cleanse, act on, or otherwise process the received sensor data. In an example, the application can be configured to securely transfer the sensor data to the asset cloud computing system 120 for further analysis, processing, or distribution.

In an example, in addition to connecting the industrial assets 200 to the asset cloud computing system 120, the protocols 212 represent a mobile gateway that enables users to bypass the asset cloud computing system 120 and establish a direct connection to an asset. This capability can be useful in, among other things, maintenance scenarios. For example, when a service technician is deployed to maintain or repair a machine, the technician can connect directly to the machine to understand its operating conditions or to perform troubleshooting.

In an example, the machine module 110 can be coupled with the asset cloud computing system using a cloud communication protocol 213. The cloud communication protocol 213 can include HTTPS, Web Sockets, or other protocol.

The machine module 110 acts as a cloud gateway module that can perform various functions on asset data, or can parse data communicated between or among the asset cloud computing system 120, the industrial assets 200, and the interface devices 220. In an example, the machine module 110 includes a file and data transfer circuit that is configured to receive files or data from one or more of the industrial assets 200. The file and data transfer module can process, package, batch, reformat, or address the received files or data such as for exchange or communication with the interfaces devices 220 or the asset cloud computing system 120.

In an example, the machine module 110 includes a sensor data aggregation circuit or database. The data aggregation circuit or database can be configured to receive sensor data from one or more of the industrial assets 200. In an example, the data aggregation circuit or database parses the received data and maintains a selected portion of the received data for analysis, storage, or transmission. In an example, the sensor data aggregation circuit or database can connect to multiple sensors (e.g., at the same or multiple different assets) and then can push an aggregated data fingerprint to the asset cloud computing system 120. The aggregated data fingerprint can be representative of the received data from the multiple sensors and can include indications of particularly noteworthy asset events (e.g., overheating conditions, characteristics after extended operation durations, operations data corresponding to extreme environmental conditions, etc.).

In an example, one or both of the machine module 110 and the security module 124 include security certificate management circuits. A certificate management circuit can be configured to manage security certificates or other communication verification procedures, such as from the machine module 110 to or from any one or more of the asset cloud computing system 120, the interface devices 220, or the industrial assets 200. In an example, the first APM 100 supports SSL-based data connections between the machine module 110 and the asset cloud computing system 120.

In an example, the machine module 110 includes a store and forward circuit. The store and forward circuit can be configured to store sensor data received from one or more of the industrial assets 200. In an example, the store and forward circuit can be configured to store commands received from, or outputs provided to, the interface devices 220. In an example, the store and forward circuit acts as an intermediate database between the industrial assets 200 and the asset cloud computing system 120, for example, by collating data from the industrial assets 200 over time and, when a specified threshold amount of data is acquired, then transmitting the collated data (or some specified portion of the collated data) to the asset cloud computing system 120. In an example, the store and forward circuit can be used when continuous communication between the machine module 110 and the asset cloud computing system 120 is unavailable, for example, when a locomotive travels through a tunnel. The machine module 110 can detect when communication with the asset cloud computing system 120 is available or interrupted and can responsively enable or disable the store and forward circuit.

In an example, the machine module 110 includes an edge analytics module. Industrial scale data can be massive and generated continuously, and may not always be efficiently transferred to the asset cloud computing system 120 for processing. The edge analytics module can provide pre-processing for received data from one or more of the industrial assets 200 such that only a pertinent portion of the received data is ultimately sent to the asset cloud computing system 120.

In an example, the edge analytics module includes a processor circuit that is configured to execute data analysis algorithms using data received from the industrial assets 200 and, optionally, using algorithms or other inputs received from the asset cloud computing system 120. In an example, the edge analytics module is configured to retrieve an algorithm from the asset cloud computing system 120 for performance locally at the machine module 110 using data from one or more of the industrial assets 120.

In an example, the machine module 110 includes a device provisioning or commissioning module. The device provisioning module can be configured to identify (e.g., automatically upon connection) a new or changed industrial asset among multiple available industrial assets 200. The device provisioning module can optionally communicate information about the new or changed asset to the asset cloud computing system 120, such as to register the asset or to receive configuration information for the asset. In an example, the device provisioning module can push software updates or other changes from the asset cloud computing system 120 to a detected new or changed asset.

In an example, the machine module 110 includes a local data store and access module. The local data store and access module can include a database that is local to the machine module 110 that stores asset data, for example, for use by a local service technician.

In an example, the machine module 110 includes a configuration management module. The configuration management module can be configured to allow remote configuration of the machine module 110 or one or more of the industrial assets 200. In an example, the configuration management module tracks configuration changes over time to provide a record of changes at an asset. In an example, the configuration management module shares information about an asset configuration with the asset cloud computing system 120.

In an example, the machine module 110 includes a device decommissioning module. In an example, the device decommissioning module can be configured to notify the asset cloud computing system 120 when a particular asset or machine is taken offline or is no longer to be under the influence of the asset cloud computing system 120.

Customers or other users may create applications to operate in the cloud computing system 120. While the applications reside in the cloud computing system 120, they may rely partially on the local machine module 110 to provide the capabilities to gather sensor data, process it locally, and then push it to the cloud computing system 120.

The cloud computing system 120 enables the IIoT by providing a scalable cloud infrastructure that serves as a basis for platform-as-a-service (PaaS), which is what developers use to create Industrial Internet applications for use in the IIoT cloud.

Services provided by the IIoT cloud and generally available to applications designed by developers include asset services, analytics services, data services, application security services, and operational services.

Asset services include services to create, import, and organize asset models and their associated business rules. Data services include services to ingest, clean, merge, and ultimately store data in the appropriate storage technology so that it can be made available to applications in the manner most suitable to their use case.

Analytics services include services to create, catalog, and orchestrate analytics that will serve as the basis for applications to create insights about industrial assets. Application security services include services to meet end-to-end security requirements, including those related to authentication and authorization.

Operational services enable application developers to manage the lifecycle and commercialization of their applications. Operational services may include development operational services, which are services to develop and deploy Industrial Internet applications in the cloud, as well as business operational services, which are services that enable transparency into the usage of Industrial Internet applications so that developers can ensure profitability.

The asset model may be the centerpiece of many, if not all, Industrial Internet applications. While assets are the instantiations of asset types (types of industrial equipment, such as turbines), the asset model is a digital representation of the asset's structure. In an example embodiment, the asset service provides Application Program Interfaces (APIs), such as Representational State Transfer (REST) APIs that enable application developers to create and store asset models that define asset properties, as well as relationships between assets and other modeling elements. Application developers can then leverage the service to store asset-instance data. For example, an application developer can create an asset model that describes the logical component structure of all turbines in a wind farm and then create instances of that model to represent each individual turbine. Developers can also create custom modeling objects to meet their own unique domain needs.

The application security services can include user account and authentication (UAA) and access control. The UAA service can provide a mechanism for applications to authenticate users by setting up a UAA zone. An application developer can bind the application to the UAA service and then use services such as basic login and logout support for the application, without needing to recode these services for each application. Access control may be provided as a policy-drive authorization service that enables applications to create access restrictions to resources based on a number of criteria.

Thus, a situation arises where application developers wishing to create industrial applications for use in the IIoT may wish to use common services that many such industrial applications may use, such as a log-in page, time series management, data storage, and the like. The way a developer can utilize such services is by instantiating instances of the services and then having their applications consume those instances. Typically, many services may be so instantiated.

There is a desire among developers to develop applications that are capable of being multi-tenant. Multi-tenant applications allow for different customers of the application to "share" the application (in the cloud), while having their respective data kept private from each other (called "isolation"). Thus, in such circumstances, an application developer may need to instantiate different instances of each service used by the application for the different customers. Thus, if an application is designed to consume four IIoT cloud services, and the application has two different customers, the application developer must eventually instantiate eight different instances. This can be very time consuming and resource intensive. Each instance must be instantiated and then bound to the application. Additionally, once the bindings are complete, the application needs to be restarted.

Thus, if a new tenant/customer is added to an application, the application developer not only needs to instantiate four new instances for the services and bind them to the application, but also restart the application for all tenants to ensure that the changes take effect.

In some example embodiments, an access control services system is configured to enable application developers to add granular authorization mechanisms to access web applications and services without having to add complex authorization to their code.

Figure 3:
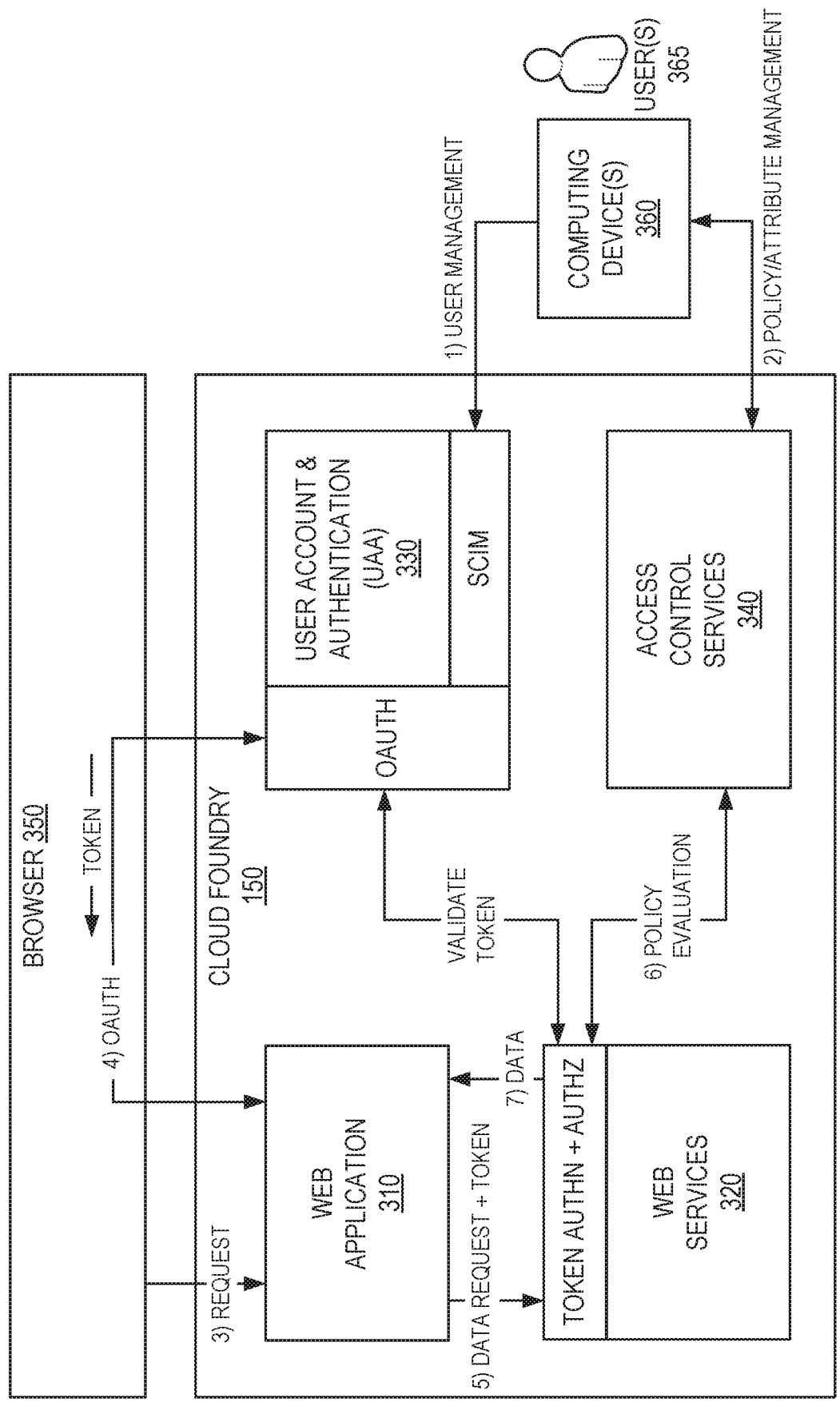
FIG. 3 illustrates an access control services (ACS) system deployed in an environment that employs local identity management in a user account and authentication server, in accordance with some example embodiments.

FIG. 3 illustrates an access control services (ACS) system 340 deployed in an environment that employs local identity management in a user account and authentication server, in accordance with some example embodiments. In FIG. 3, the ACS system 340 is incorporated into the cloud foundry layer 150 of FIG. 1. In some example embodiments, the cloud foundry layer 150 also comprises a web application 310, one or more web services 320, and a user account and authentication (UAA) system 330.

In some example embodiments, the web services 320 comprise any services offered by an electronic device to another electronic device, communicating with each other via a network (e.g., the Internet), including, but not limited to the services provided by the IIoT cloud discussed above. In some example embodiments, the web services 320 are configured to enable a user, such as user 365, to access one or more resources via a computing device 360. Such resources can comprise industrial assets, such as an asset of the asset community 102 in FIG. 1, and the web services 320 can comprise any of the modules 121-125 of FIG. 1. However, it is contemplated that other types of resources and web services are also within the scope of the present disclosure.

In some example embodiments, the web application 310 is configured to enable a user 365 to use the web services 320. The user 365 can use a computing device 360 to communicate with the web application 310 via a browser 350, and the web application 310 communicates with the appropriate web service 320. For example, the user 365 can submit a request for data via the web application 310 for data from a web service 320. The web service 320 can retrieve the requested data and return the retrieved data to the web application 310 for presentation to the computing device 360 of the user 365 via a browser 350.

Figure 5:
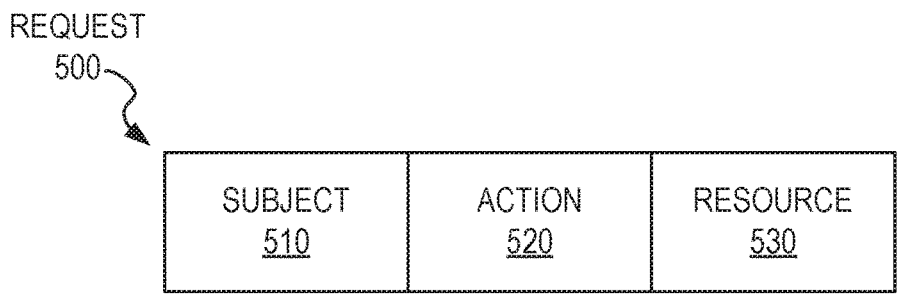
FIG. 5 is a block diagram illustrating components of a web service request, in accordance with some example embodiments.

FIG. 5 is a block diagram illustrating components of a web service request 500, in accordance with some example embodiments. The request 500 can comprise an HTTP request. However, other types of requests are also within the scope of the present disclosure. In some example embodiments, the web service request 500 comprises subject data 510, action data 520, and resource data 530. The subject data 510 comprises information about the user that submitted the request (e.g., name or identification of the user, organization that the user belongs to), which can be extracted from an access token issued to the user. The action data 520 comprises information about what the user is trying to do, such as an HTTP method (e.g., GET, PUT, POST, DELETE). The resource data 530 comprises information about the resource to which the action is being requested to apply (e.g., a uniform resource identifier of the resource, contextual information about the resource).

In some example embodiments, the UAA system 330 comprises a service provided configured to manage users and OAuth2 clients, acting as an OAuth2 provider, issuing access tokens for client applications to use when they act on behalf of users 365 of the cloud foundry layer 150. In collaboration with a login server, the UAA system 330 can authenticate users with their cloud foundry layer 150 credentials, and can act as a single sign-on (SSO) service using those credentials (or others). The UAA system 330 can provide endpoints for managing user accounts and for registering OAuth2 clients.

The ACS system 340 enables application developers to add granular authorization mechanisms to access web applications 310 and web services 320 without having to add complex authorization logic to their code. In some example embodiments, the ACS system 340 works in conjunction with the UAA system 330 in the cloud foundry layer 150. A combination of the UAA system 330 and the ACS system 340 can provide a complete workflow for authentication and authorization. The ACS system 340 can provide the ability to maintain access-decision data as policies and attributes, exclusive security for multiple clients, since the ACS system 340 is tenant-aware, and support for fine-grained authorization policies.

Figure 4:
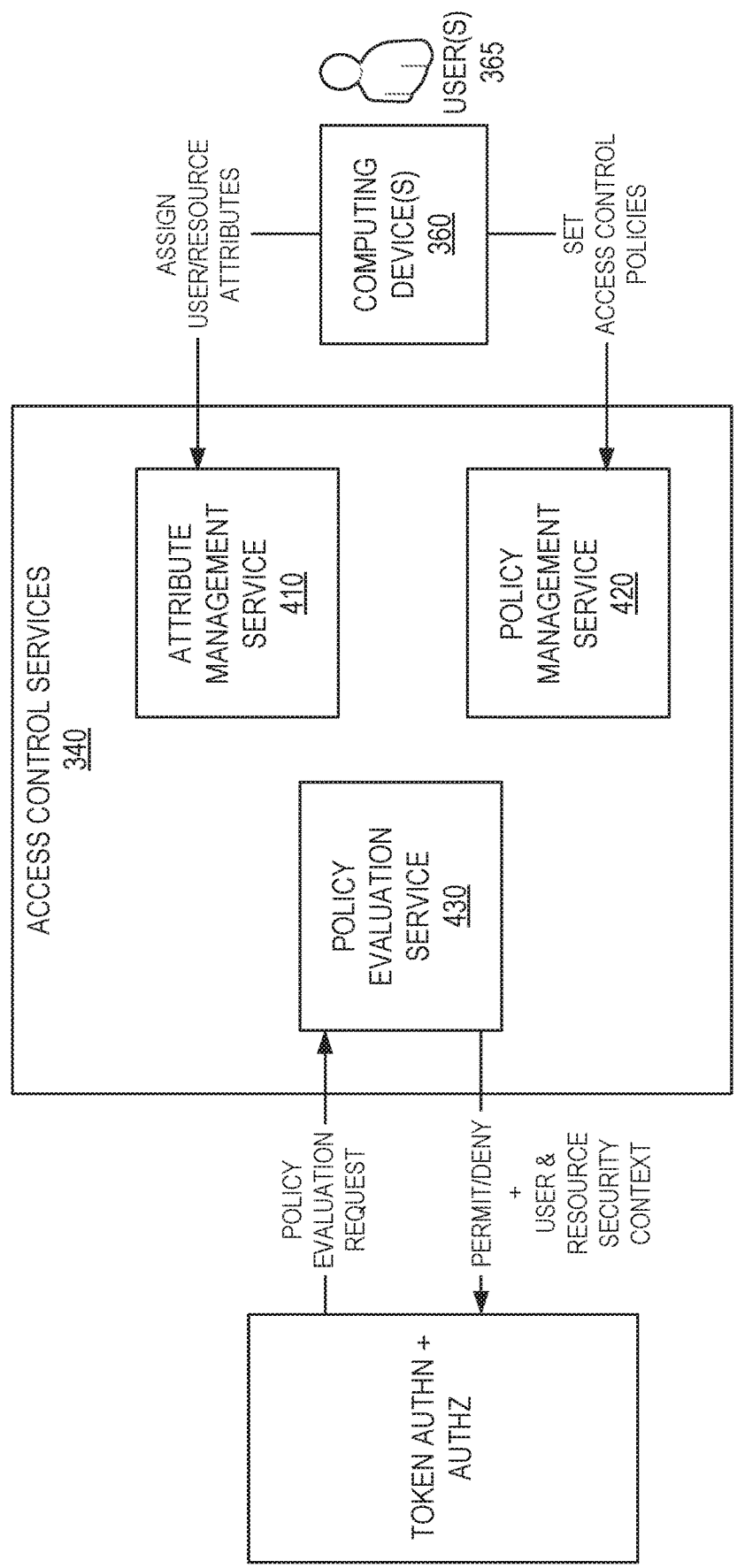
FIG. 4 illustrates an architecture for the access control services system, in accordance with some example embodiments.

FIG. 4 illustrates an architecture for the ACS system 340, in accordance with some example embodiments. In some example embodiments, the ACS system 340 comprises an attribute management service 410, a policy management service 420, and a policy evaluation service 430.

In some example embodiments, the ACS system 340 provides attribute-based access control, which defines an access control paradigm whereby access rights are granted to users through the use of policies which combine attributes together. The policies can use any type of attributes (user attributes, resource attributes, environment attribute etc.). Attribute values can be set-valued or atomic-valued. Set-valued attributes contain more than one atomic values (e.g., role, project). Atomic-valued attributes contain only one atomic value (e.g., clearance, sensitivity). Attributes can be compared to static values or to one another, thus enabling relation-based access control.

In some example embodiments, the attribute management service 410 provides CRUD operations for user and resource attributes, enabling users 365 (with required privileges) to create attributes for users and resources. Attributes are characteristics of a user or a resource that can be used to make access-control decisions. An attribute can be identified by an issuer, the entity that asserts the attribute, and a name that describes the attribute. Some example of user and resource attributes include, but are not limited to, the organization, site, and/or group to which a resource belongs. Attributes are used in conjunction with access-control policies for user authorization.

Figure 6:
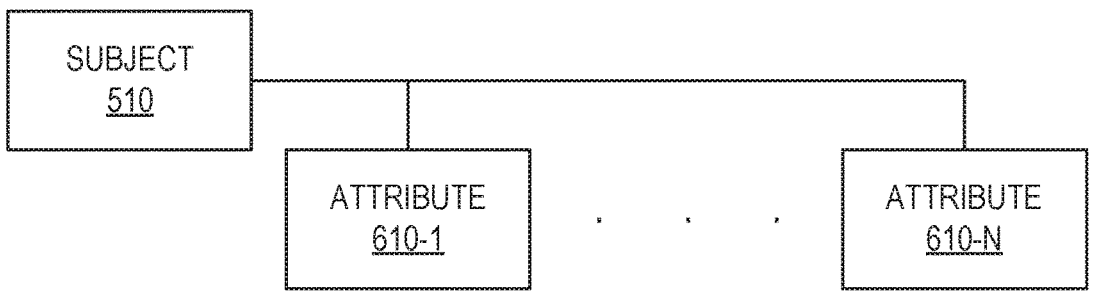
FIG. 6 is a block diagram illustrating attributes of a subject, in accordance with some example embodiments.

FIG. 6 is a block diagram illustrating attributes 610 of a subject 510, in accordance with some example embodiments. In some example embodiments, one or more attributes (e.g., attributes 610-1, 610-2, . . . , 610-N) are stored in association with the subject 510. For example, the attributes 610 can be stored with the subject 510 in a graph data structure or in a table. Other storage configuration for the attributes 610 of a subject 510 are also within the scope of the present disclosure. While the subject 510 itself or one of its attributes 610 can comprise an identification of the subject 510 (e.g., user name), the subject 510 can also have one or more attributes 610 that comprises user information about the subject (e.g., user) other than an identification of the subject, including, but not limited to, an organization to which the user 365 belongs (e.g., Acme Corp.), a group to which the user 365 belongs (e.g., Engineering Department), or a role of the user 365 (e.g., Analyst). Other types of user information are also within the scope of the present disclosure.

Figure 7:
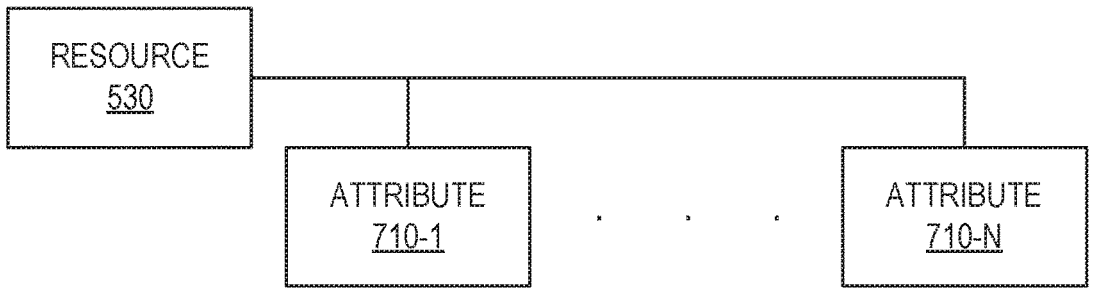
FIG. 7 is a block diagram illustrating attributes of a resource, in accordance with some example embodiments.

FIG. 7 is a block diagram illustrating attributes of a resource 530, in accordance with some example embodiments. In some example embodiments, one or more attributes (e.g., attributes 710-1, 710-2, . . . , 710-N) are stored in association with the resource 530. For example, the attributes 710 can be stored with the resource 530 in a graph data structure or in a table. Other storage configuration for the attributes 710 of a resource 530 are also within the scope of the present disclosure. While the resource 530 itself or one of its attributes 710 can comprise an identification of the resource 530 (e.g., resource name), the resource 530 can also have one or more attributes 710 that comprises resource information about the resource 530 other than an identification of the resource 530, including, but not limited to, an organization to which the resource 530 belongs (e.g., Acme Corp.), a user role that is permitted to access the resource (e.g., Analyst), or a location of the resource (e.g., Site A in San Ramon, Calif.). Other types of resource information are also within the scope of the present disclosure.

Referring back to FIG. 4, in some example embodiments, the policy management service 420 provides (CRUD) operations for application policies, enabling users 365 (with required privileges) to create, read, update, and delete access-control policies. An access control policy contains a set of rules that determine the required permissions for the specified subjects and resources. The rules can take into consideration the user attributes, the action the user wants to perform, the resource URI, and any resource attributes that further describe the resource.

Figure 8:
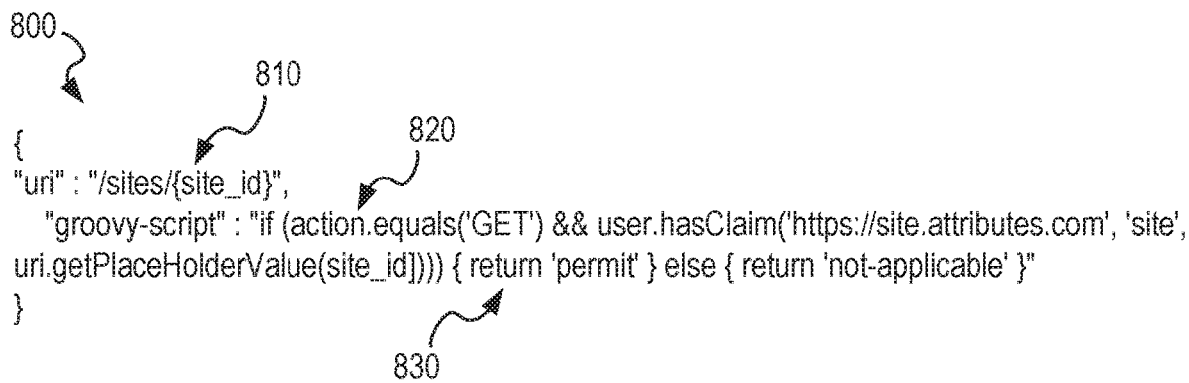
FIG. 8 illustrates an access control policy within a script, in accordance with some example embodiments.

FIG. 8 illustrates an access control policy 800 within a script, in accordance with some example embodiments. In some example embodiments, the access control policy comprises a target 810, a condition 820, and an effect 830. A target 810 comprises a set of one or more simplified conditions for the subject 520, action 520, and/or resource 530 that must be met for a policy set, policy, or rule to apply to a given request (e.g., policy applies to requests 500 where the subject 510 is a member of group A, the action 520 is a GET method, and the resource 530 is "/reports/{report-id}"). Once a policy or policy set is found to apply to a given request, its rules are evaluated to determine the access decision and response. A condition 520 exists in rules and is an advanced form of a target 810 that can use a broader range of functions and can be used to compare two or more attributes together (e.g., subject-id=doctor-id). The use of a condition 520 enables the segregation of duty checks or relationship-based access control. An effect 830 is the result of a condition 530 being satisfied (e.g., permit request action, deny requested action). An effect 830 can also be the result of a condition 530 not being satisfied or can be a default result.

In some example embodiments, a target comprises information that the ACS system 340 uses to determine whether an access control policy applies to a user request, an effect comprises the access control decision associated with a policy (e.g., permit or deny), and a condition is used to determine whether the effect applies to the request.

One or more access control policies 800 can be contained within a single script. In some example embodiments, a script comprising one or more access control policies 800 is stored for subsequent access, modification, and evaluation. The script can comprise a JavaScript Object Notation (JSON) script. However, it is contemplated that other types of scripts are also within the scope of the present disclosure. By enabling users 365 to create and modify access control policies 800 in script form using a scripting language, the ACS system 340 reduces the overhead and complexity of writing policies as configuration, such as using Extensible Markup Language (XML). The ACS system 340 can also enable a user 365 to perform CRUD operations for the attributes and policies of a variety of different services all using a single system, as opposed to accessing each individual service to perform CRUD operations for each service.

Referring back to FIG. 4, in some example embodiments, the policy evaluation service 430 processes policy evaluation (such as access control) requests for an OAuth client, evaluating policies based on web service requests for authorization. In some example embodiments, a web service request is sent to the policy evaluation service 430, which then validates the request against a policy and defined attributes and returns a decision of permit or deny for the request. In some example embodiments, the policy evaluation service 430 extracts subject information (e.g., identification of the user and user attributes) from the access token.

Various topologies can be deployed when using both the UAA system 330 and the ACS system 340. In some example embodiments, while the mechanism for authorization remains the same in all topologies, the authentication process varies depending on how the users are provisioned.

As previously discussed, FIG. 3 illustrates the ACS system 340 deployed in an environment that employs local identity management in a user account and authentication server, in accordance with some example embodiments;

In some example embodiments, an administrator (e.g., a user 365 that is credentialed as an administrator) provisions users 365 through one or more System for Cross-Domain Identity Management (SCIM) APIs of the UAA system 330. The administrator, or another administrator, sets up policies and user attributes using the ACS system 340. Subsequently, an application user (e.g., not an administrator) requests data from a web service 320 using browser 350. The request is transmitted to the web application 310 associated with the web service 320. The web application 310 transmits an authentication request to the UAA system 330. If the user 365 is set up in the UAA system 330 (e.g., if the user 365 has a corresponding account), then the authentication request is approved, the user 365 is authenticated, and the UAA system 330 issues an access token, such as a JSON web token (JWT) to the web application 310. If the data request already contains a valid access token, then this step is not required. The web application 310 transmits the data request and the access token to the web service 320. The web service 320 uses one or more REST APIs of the ACS system 340 to authorize the user 365 based on a policy evaluation, as previously discussed herein. If the user 365 is authorized by the ACS system 340, then proper notification is provided to the web service 320, which then transmits the requested data to the web application 310, where it can be consumed by the user 365 via his or her computing device 360 and browser 350.

Figure 9:
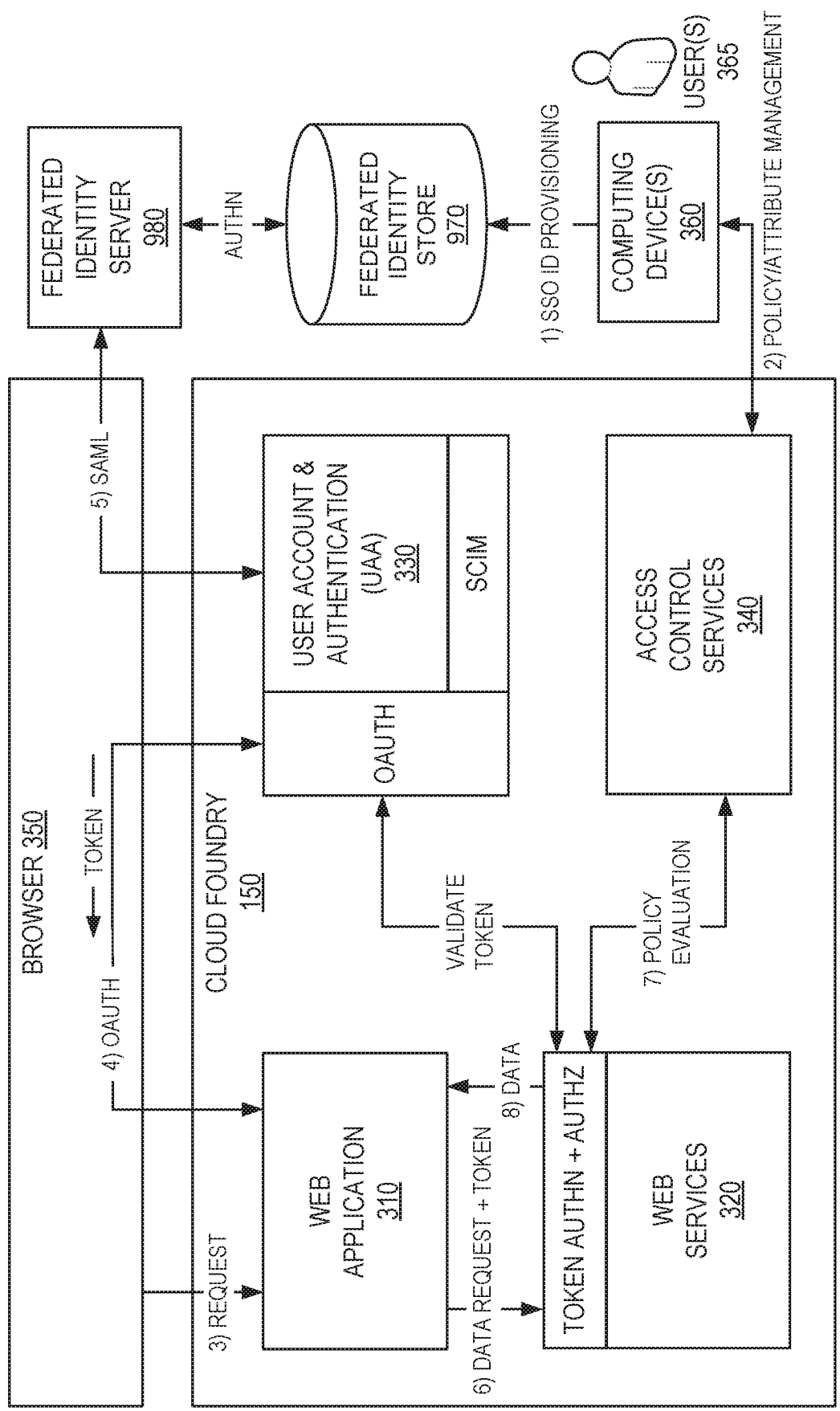
FIG. 9 illustrates an access control services system deployed in an environment that employs federated identity management, in accordance with some example embodiments.

FIG. 9 illustrates the ACS system 340 deployed in an environment that employs federated identity management, in accordance with some example embodiments. The system architecture and operation in FIG. 9 is similar to those of FIG. 3. However, in FIG. 9, instead of performing local authentication using the UAA system 330, the users 365 are authenticated using a federated identity store 970. Instead of the administrator provisioning users 365 through a SCIM API of the UAA system 330, the administrator provisions users 365 through the federated identity store 970. A federated identity is a mechanism of linking a person's electronic identity and attributes, stored across multiple distinct identity management systems. The administrator can perform single sign-on (SSO) provisioning with the federated identity store 970. SSO is a property of access control of multiple related, but independent software systems in which a user's single authentication ticket, or token, is trusted across multiple information technology systems or even organizations. In some example embodiments, when authenticating a user 365, the UAA system 330 exchanges authentication data, such as via Security Assertion Markup Language (SAML), with a federated identity server 980, which authenticates the user by communicating with the federated identity store 970.

Figure 10:
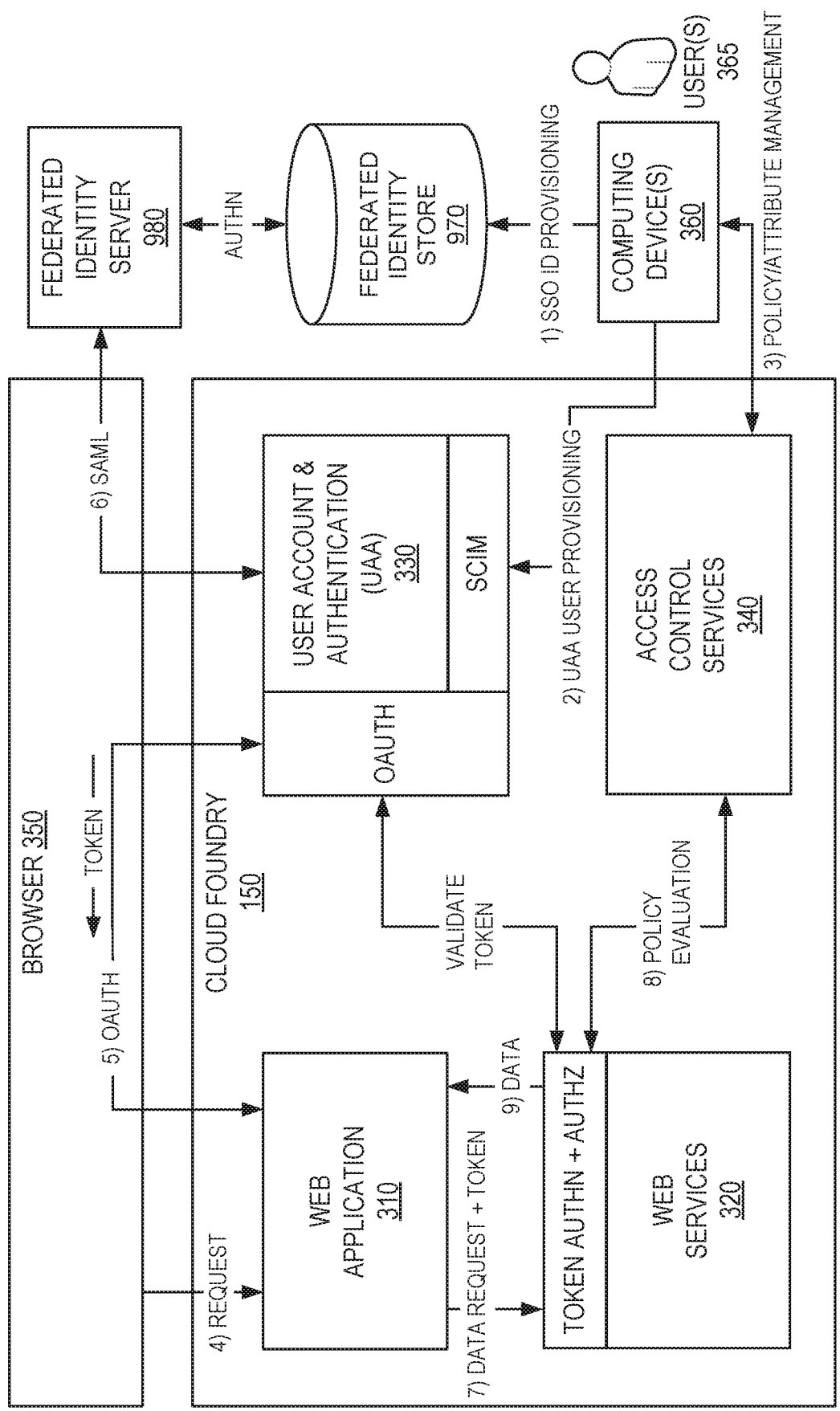
FIG. 10 illustrates an access control services system deployed in an environment that employs federated identity management in conjunction with identity management using a user account and authentication server, in accordance with some example embodiments.

FIG. 10 illustrates an access control services system deployed in an environment that employs federated identity management in conjunction with identity management using the UAA system 330, in accordance with some example embodiments.

It is contemplated that other topologies are also within the scope of the present disclosure.

In some example embodiments, attribute-based access control system, such as ACS system 340, can enable administrators to make an attribute of a user or an attribute of a resource conditional, thus creating a scope for the attribute. For example, the administrator might want to identify a particular user 365 as being an analyst, but only being an analyst in certain situations, such as for a particular set of assets or asset locations. For example, the administrator can create a scoped attribute of analyst for Bob, where Bob is only an analyst for site C and site E. Therefore, if a policy for a resource of site A requires that only an analyst can have access to certain data, Bob will not be permitted access, since his attribute of being an analyst is scoped to only being applied for site C and site E. In this respect, the ACS system 340 can enable an administrator to create a scoped attribute for a user 365, such that the user 365 has the scoped attribute, but only when some other attribute(s) exists, such as an attribute of an action of the request or an attribute of a resource of the request.

Figure 11:
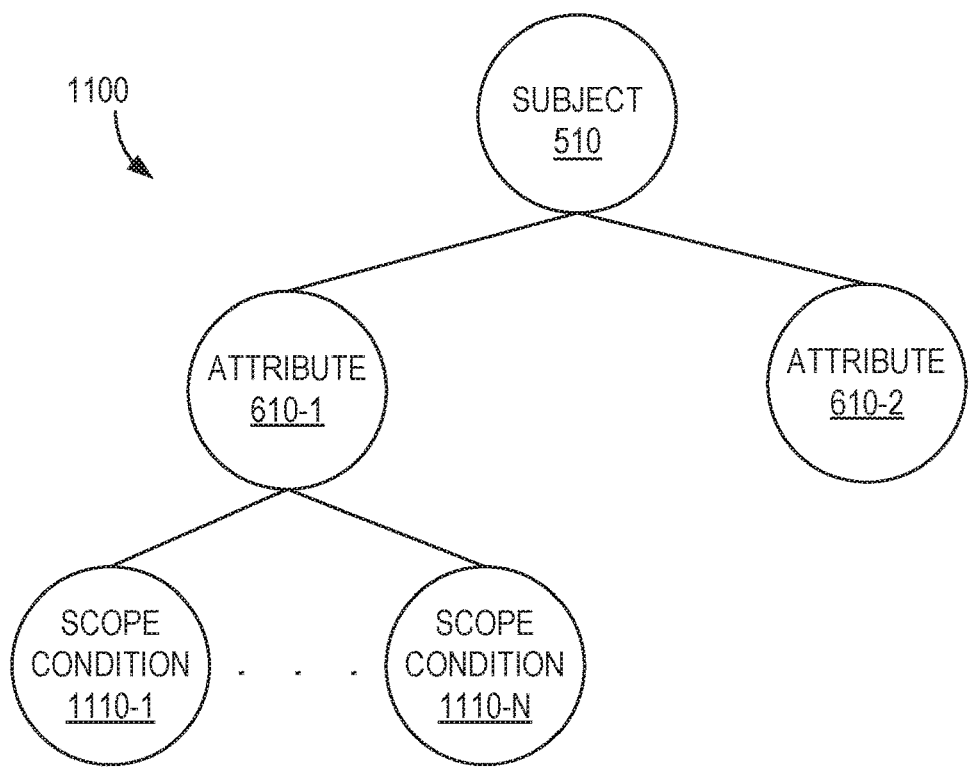
FIG. 11 illustrates a graph data structure comprising scope conditions for a scoped attribute of a subject, in accordance with some example embodiments.

In some example embodiments, a scoped attribute is implemented using a scope condition, which can be stored in a relationship with the corresponding attribute that is to be scoped, such as in a graph data structure in a graph database. FIG. 11 illustrates a graph data structure 1100 comprising scope conditions 1110 for a scoped attribute 610 of a subject 510 (e.g., a user 365), in accordance with some example embodiments. The subject 510 can comprise one or more attributes 610. In some example embodiments, one or more of the attributes 610 comprises one or more scope conditions 1110 (e.g., scope condition 1110-1, scope condition 1110-2, . . . , scope condition 1110-N).

Figure 12:
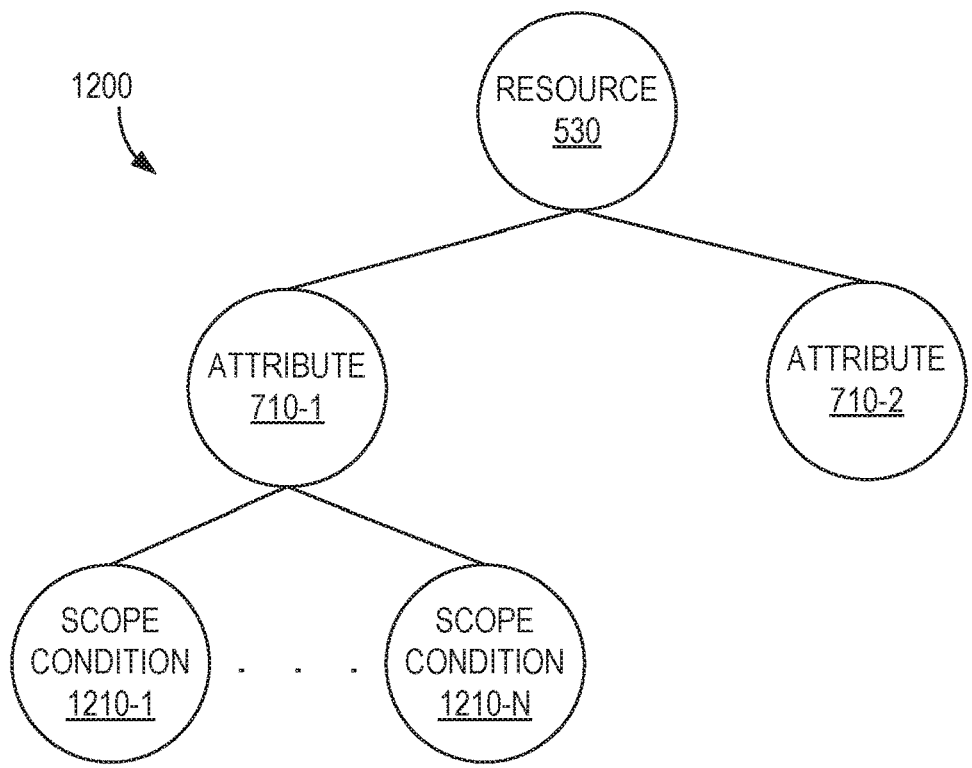
FIG. 12 illustrates a graph data structure comprising scope conditions for a scoped attribute of a resource, in accordance with some example embodiments.

FIG. 12 illustrates a graph data structure 1200 comprising scope conditions 1210 for a scoped attribute 710 of a resource 530, in accordance with some example embodiments. The resource 530 can comprise one or more attributes 710. In some example embodiments, one or more of the attributes 710 comprises one or more scope conditions 1210 (e.g., scope condition 1210-1, scope condition 1210-2, . . . , scope condition 1210-N).

This use of scoped attributes enables an administrator to create conditions for access by configuring a user account rather than by writing or modifying a policy. As a result, the administrator has more flexibility in terms of how to control access to resources. In some example embodiments, at the time of policy evaluation, the policy evaluation service 430 performs a graph traversal of the graph data structure of corresponding user 365, which can be stored and maintained by the attribute management service 410. If the policy evaluation service 430 finds a first attribute, and then finds another attribute directly linked in the graph data structure to the first attribute in a lower hierarchical position, then the policy evaluation service 430 can apply the other attribute as a scope condition for the first attribute, thereby scoping the first attribute.

As previously discussed herein, multi-tenant applications allow for different customers of the application to "share" the application (in the cloud). In some example embodiments, a web application 310 is a multi-tenant application having multiple instances of the same web service 320. Each tenant can have its own zone, where only users authorized for that zone can access data of that zone's instance of the web service 320.

Figure 13:
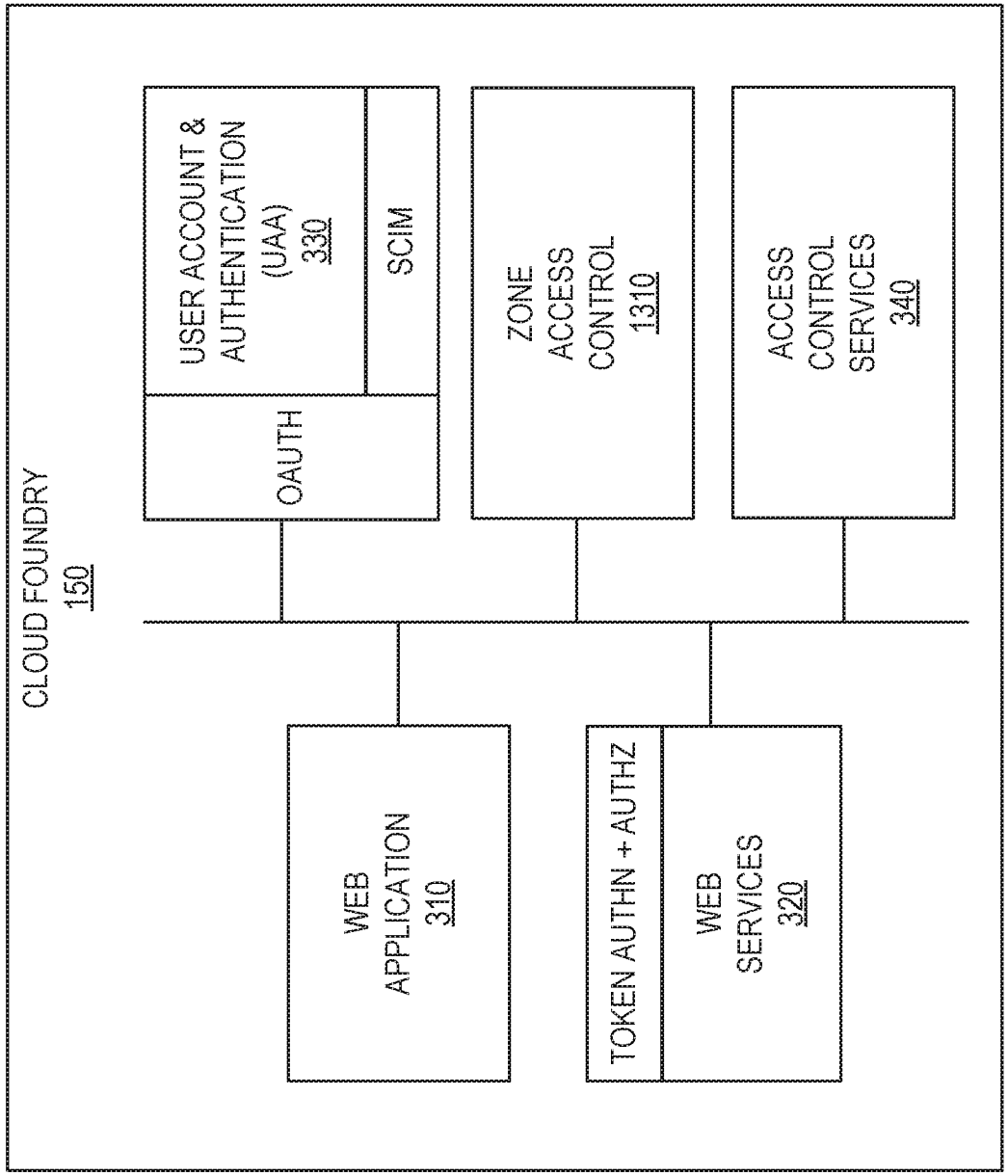
FIG. 13 illustrates a zone access control (ZAC) system deployed in a web services environment, in accordance with some example embodiments.

FIG. 13 illustrates a zone access control system 1310 deployed in a web services environment, in accordance with some example embodiments. In some example embodiments the zone access control system 1310 is incorporated into the cloud foundry layer 150. As such, it is contemplated that the zone access control system 1310 can operate in conjunction with the ACS system 340 features and the scoped attribute features disclosed herein. Although, it is also contemplated that the zone access control system 1310 can be incorporated into other environments as well.

In some example embodiments, when a web service 320 receives a request and an access token, as previously disclosed herein, the web service 320 can send the access token to the zone access control system 1310. The zone access control system 1310 can analyze or evaluate the access token to determine what zone the user that submitted the request is allowed to access. The zone access control system 1310 can determine whether the user is allowed access to the same zone as the user is requesting to access. If the zone access control system 1310 determines that there is a match between the zone for which the user has been allowed access via the access token and the zone for which the user is requesting access, then the zone access control system 1310 can permit the request to be processed, such as by notifying the web service 320 to proceed with an authorization evaluation with the ACS system 340, as previously discussed herein. If the zone access control system 1310 determined that there is a mismatch between the zone for which the user has been allowed access via the token and the zone for which the user is requesting access, then the zone access control system 1310 can notify the web service 320 that the user does not have permission to access the data, and the web service 320 can deny the user access without having to check with the ACS system 340 or any other access authorization system.

In some example embodiments, the zone access control system 1310 is configured to not only check to make sure that there is a match between the zone for which the user has been allowed access via the access token and the zone for which the user is requesting access, but also to make sure that the provider of the access token matches a security token provider that has been identified as being trusted or appropriate for that zone. The zone access control system 1310 can verify this match by comparing an identification of the token provider, stored or otherwise indicated by the access token, with the corresponding security token provider listed for the zone in a data store, such as in a stored table.

Figure 14:
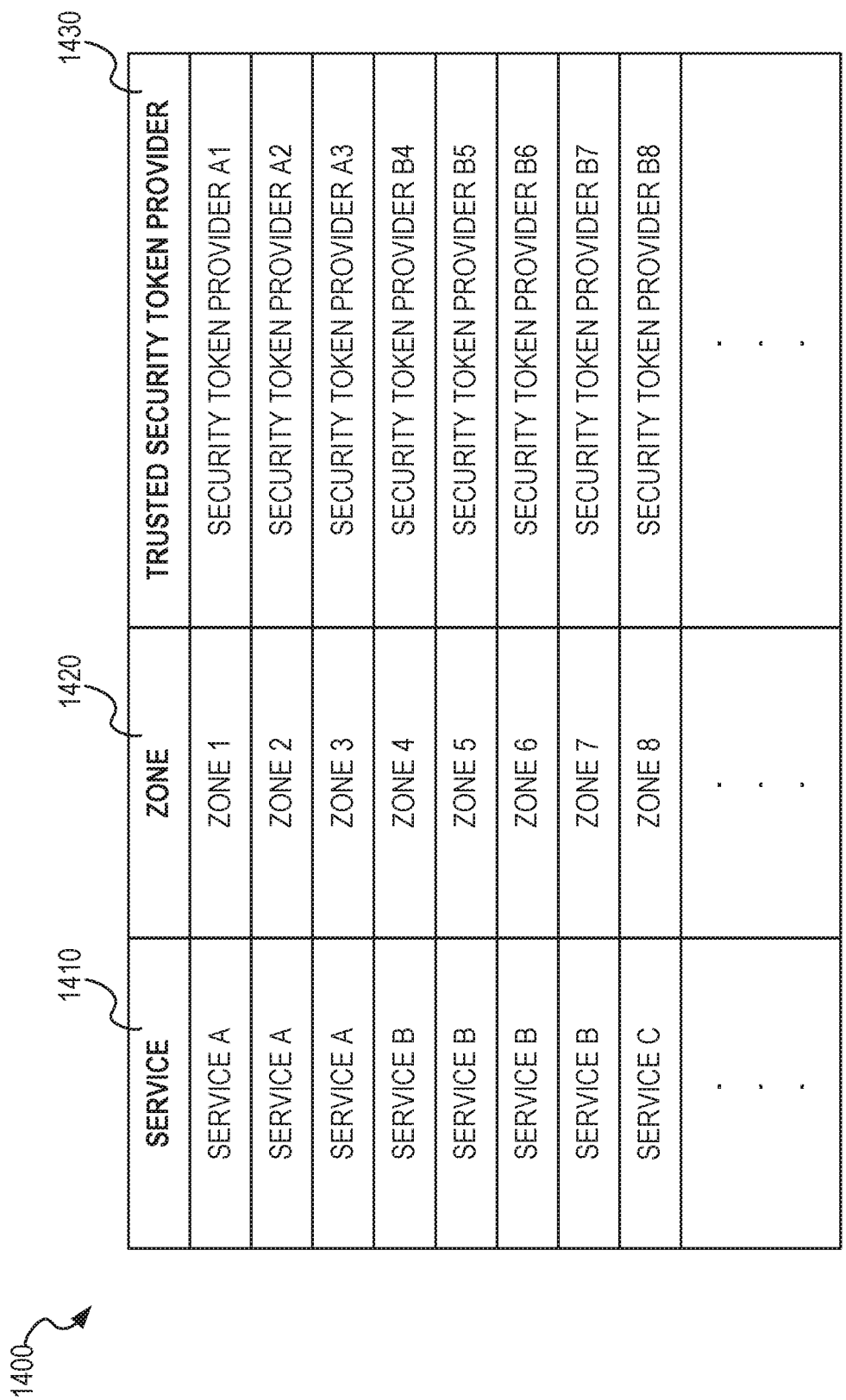
FIG. 14 illustrates a table of trusted security token providers for different zones of different services, in accordance with some example embodiments.

FIG. 14 illustrates a table 1400 of trusted security token providers 1430 for different zones 1420 of different services 1410, in accordance with some example embodiments. In some example embodiments, the table 1400 comprises corresponding zones 1420 for each instance of a service 1410. For example, in FIG. 14, Service A has three corresponding zones 1420: Zone 1, Zone 2, and Zone 3, each corresponding to an individual tenancy of Service A. Similarly, in FIG. 14, Service B has four corresponding zones 1420: Zone 4, Zone 5, Zone 6, and Zone 7, each corresponding to an individual tenancy of Service B. Each zone 1420 has one or more corresponding trusted security token providers 1430. For example, Security Token Provider A1 is the trusted security token provider 1430 of Zone 1, Security Token Provider A2 is the trusted security token provider 1430 of Zone 2, Security Token Provider A3 is the trusted security token provider 1430 of Zone 3, and so on and so forth.

When the zone access control system 1310 is informed by the web service 320 that the user 365 has requested access to a particular zone of the web service 320, the zone access control system 1310 can read the access token (e.g., the web service 320 can provide the access token to the zone access control system 1310 along with the information about the request) and determine the zone indicated by the access token, as well as determine what security token provider issued the access token. The zone access control system 1310 can then compare the security token provider that issued the access token with the correspond trusted security token provider 1430 identified in the table 1400 as being the appropriate token provider for the corresponding zone 1420 of the request. If the security token provider that issued the access token matches the trusted security token provider 1430 in the table 1400 for the requested zone 1420 of the request, then the zone access control system 1310 can transmit an indication of such match to the web service 320, so that the web service 320 can proceed with further processing of the request, such as seeking authorization from the ACS system 340. If the security token provider that issued the access token does not match the trusted security token provider 1430 in the table 1400 for the requested zone 1420 of the request, then the zone access control system 1310 can transmit an indication of such mismatch to the web service 320, so that the web service 320 can deny access to the requesting user 365.

In some example embodiments, a zone comprises a scope to define logical data partitioning. In one example use, a zone is defined for each business customer of a service for data isolation. An audience can comprise a service that is meant for developers to provide a common way to provision and manage zones, and to provide a common mechanism to determine if a service request has access to the requested zone. In one example embodiment:

- Application—apm.ge.com is an application hosted on a cloud-based platform-as-a-service that is configured to enable industrial-scale analytics for asset performance management (APM) and operations optimization by providing a standard way to connect machines, data, and people, such as the Predix platform by General Electric.
- apm uses a service 'asset' which is available in the cf marketplace.
- apm has multiple tenants: pgs, rasgas and so on.
- 'asset' is a multi-tenant service backed by a single 'asset' cf application in cloud foundry.
- 'asset' uses zone access control to enforce data separation between its tenants.

Figure 15:
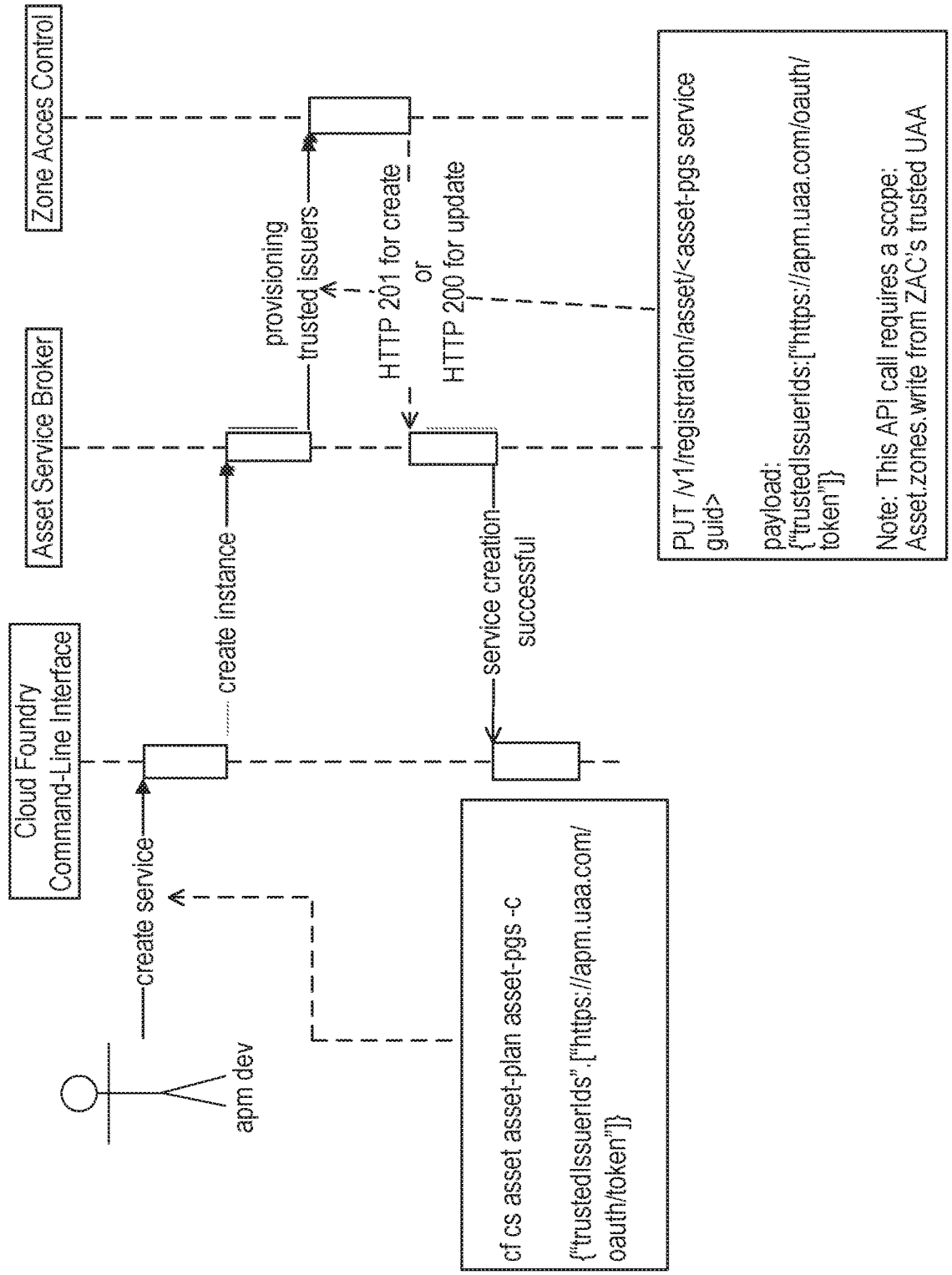
FIG. 15 illustrates zone/service instance creation, in accordance with some example embodiments.
Figure 16:
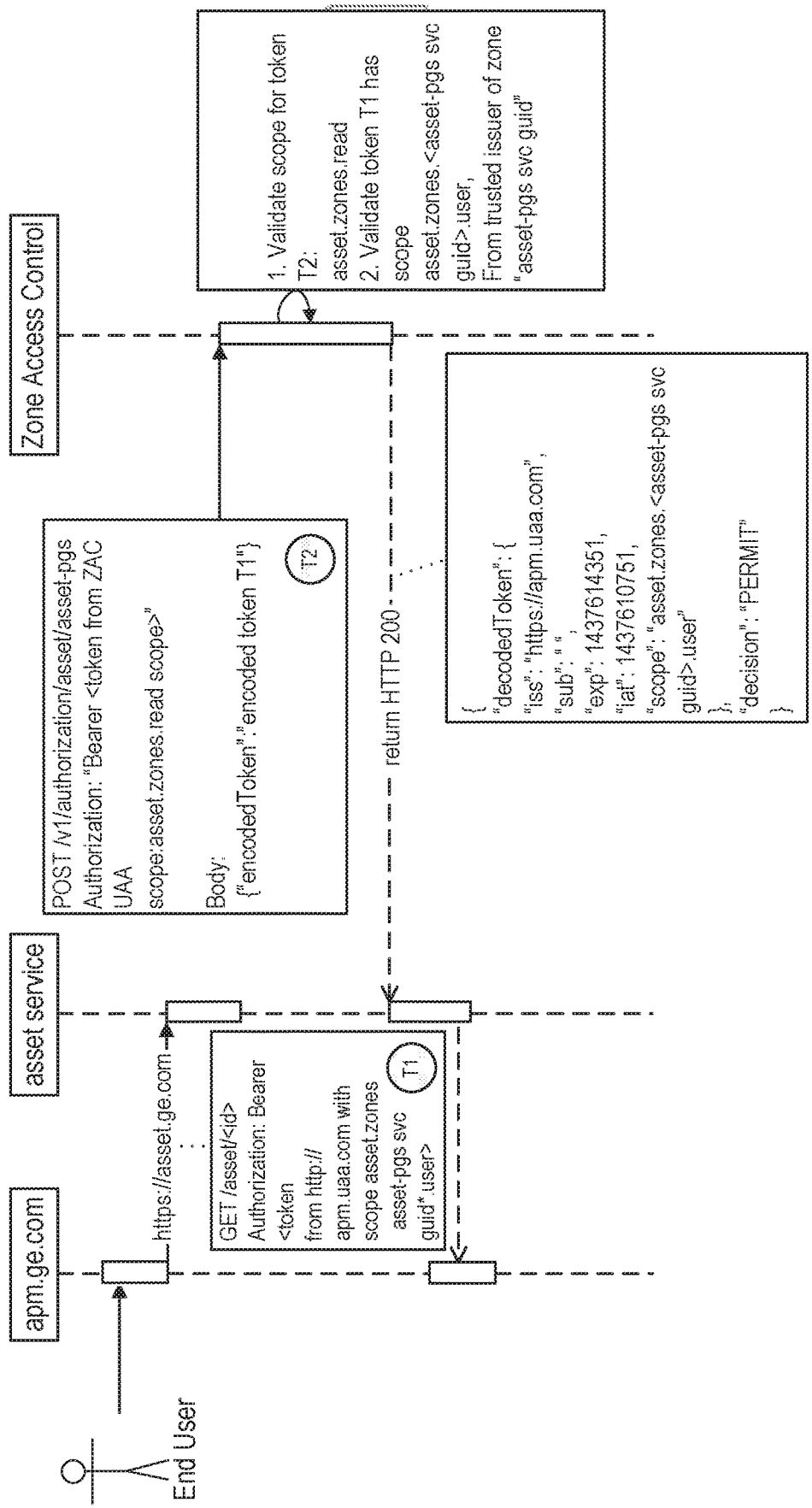
FIG. 16 illustrates zone authorization of end user requests, in accordance with some example embodiments.

FIG. 15 illustrates zone/service instance creation, in accordance with some example embodiments. In FIG. 15, the APM creates one service instance of asset per tenant (asset-pgs) based on the direction of a user, such as an APM developer. FIG. 16 illustrates zone authorization of end user requests, in accordance with some example embodiments.

In some example embodiments, for the purpose of zone authorization, zone access control requires a token with a scope, such as <service>.zones.<service-instance-guid>.user e.g., asset.zones.3c189ce5-74c0-4195-acc2-db3b7cac6eba.user. An application may use different approaches to obtain this token from its UAA system 330.

In some example embodiments, if the application has a way to independently verify that the current user has access to the zone they are requesting, then the application can use a "client token" with the appropriate scope to call the service (e.g., 'asset' in a sample scenario), after verifying that the current user has access to the requested zone. In this approach, the application can be required to provision a OAuth client which has "authorities" for one or more zones (e.g., asset.zones.3c189ce5-74c0-4195-acc2-db3b7cac6eba.user, asset.zones.<asset-tenant2 service guid>.user). In some example embodiments, the scope of the requested token must be restricted to only the zone being accessed in the current request.

In some example embodiments, if an application team wants to manage access of end users access to zones in UAA system 330, the following operations can be performed:
1. Create a group in the UAA system 330 for each zone (e.g., asset.zones.3c189ce5-74c0-4195-acc2 db3b7cac6eba.user).
2. Create a client with scopes to access all zones for one or more services (e.g., "asset.zones.*.user, service2.zones.*.user").
3. When an end user is provisioned, add the user to one or more groups for the zones it has access to.
4. At runtime, obtain a resource owner token (T1) with the client (provisioned in step 2). The scope requested for the user token must be restricted to only the zone and service being accessed by the current request (e.g., asset.zones.3c189ce5-74c0-4195-acc2-db3b7cac6eba.user).

FIGS. 17 and 18 illustrate tables of actions that can be performed by the zone access control system 1310, including corresponding sample requests and responses to the requests, in accordance with some example embodiments. As seen in FIGS. 17 and 18, each action may have a corresponding required scope enforced by the zone access control system 1310.

In some example embodiments, service brokers can be employed to ensure a consistent interface for developers using the platform services. In some example embodiments, service brokers accept a named parameter with a collection of issuer ids for all UAA issuer identifications trusted by that instance. FIG. 19 is sample pseudocode for service brokers to accept a named parameter ('trustedIssuerIds') with a collection of issuer ids for all user account and authorization system issuer identifications trusted by that instance, in accordance with some example embodiments.

In some example embodiments, when a binding request is received by a service broker, any combination of one or more of the following information is included in the service instance binding response credentials field, which is reflected in FIG. 20, which shows sample pseudocode illustrating a credentials field for a service instance binding response, in accordance with some example embodiments:

- uri: URI to access service instance
- HTTP Header information to access specific zone represented by the instance created
- -zone-http-header-name (e.g., 'Predix-Zone-Id')
- -zone-http-header-value
- zone-oauth-scope: scope required in end-user token to access specific zone represented by the instance created In some example embodiments, zone specific requests are employed via a client-side utility configured to authorize service requests for a zone, without making an 'authorize' REST call to the zone access control system 1310 for every user request. In some example embodiments, this utility caches registered trusted issuers for the configured service.

In some example embodiments, this utility validates tokens using a spring security filter, based on issuer and scope.

In some example embodiments, dependencies (e.g., a Maven dependency) can be used in the authorization of service requests. FIG. 21 is sample pseudocode for a dependency, in accordance with some example embodiments.

Non-zone requests can also be employed or handled. In some example embodiments, if a request is not zone specific (e.g., no zone header), the utility only validates the token specified by "default.trusted.issuer.id." The service can assert any additional scopes as needed, using a spring security configuration. FIG. 22 illustrates a spring security configuration, in accordance with some example embodiments.

FIG. 23 is sample pseudocode for registering a token service, in accordance with some example embodiments. FIG. 24 is sample pseudocode for accessing a zone, in accordance with some example embodiments.

FIG. 25 illustrates another access control policy 2500 within a script, in accordance with some example embodiments. In some example embodiments, the access control policy 2500 comprises a target 2510, a condition 2520, and an effect 2530. The target 2510 comprises a set of one or more simplified conditions for a subject, an action, and/or a resource that must be met for a policy set, policy, or rule to apply to a given request. Once a policy or policy set is found to apply to a given request, its rules are evaluated to determine the access decision and response. The condition 2520 exists in rules and is an advanced form of a target 2510 that can use a broader range of functions and can be used to compare two or more attributes together. The use of the condition 2520 enables the segregation of duty checks or relationship-based access control. The effect 2530 is the result of the condition 2530 being satisfied (e.g., permit request action, deny requested action). The effect 2530 can also be the result of the condition 2530 not being satisfied or can be a default result.

In some example embodiments, a target comprises information that the ACS system 340 uses to determine whether an access control policy applies to a user request, an effect comprises the access control decision associated with a policy (e.g., permit or deny), and a condition is used to determine whether the effect applies to the request.

One or more access control policies 2500 can be contained within a single script. In some example embodiments, a script comprising one or more access control policies 2500 is stored for subsequent access, modification, and evaluation. The script can comprise a JavaScript Object Notation (JSON) script. However, it is contemplated that other types of scripts are also within the scope of the present disclosure. By enabling users 365 to create and modify access control policies 2500 in script form using a scripting language, the ACS system 340 reduces the overhead and complexity of writing policies as configuration, such as using Extensible Markup Language (XML). The ACS system 340 can also enable a user 365 to perform CRUD operations for the attributes and policies of a variety of different services all using a single system, as opposed to accessing each individual service to perform CRUD operations for each service.

Figure 26:
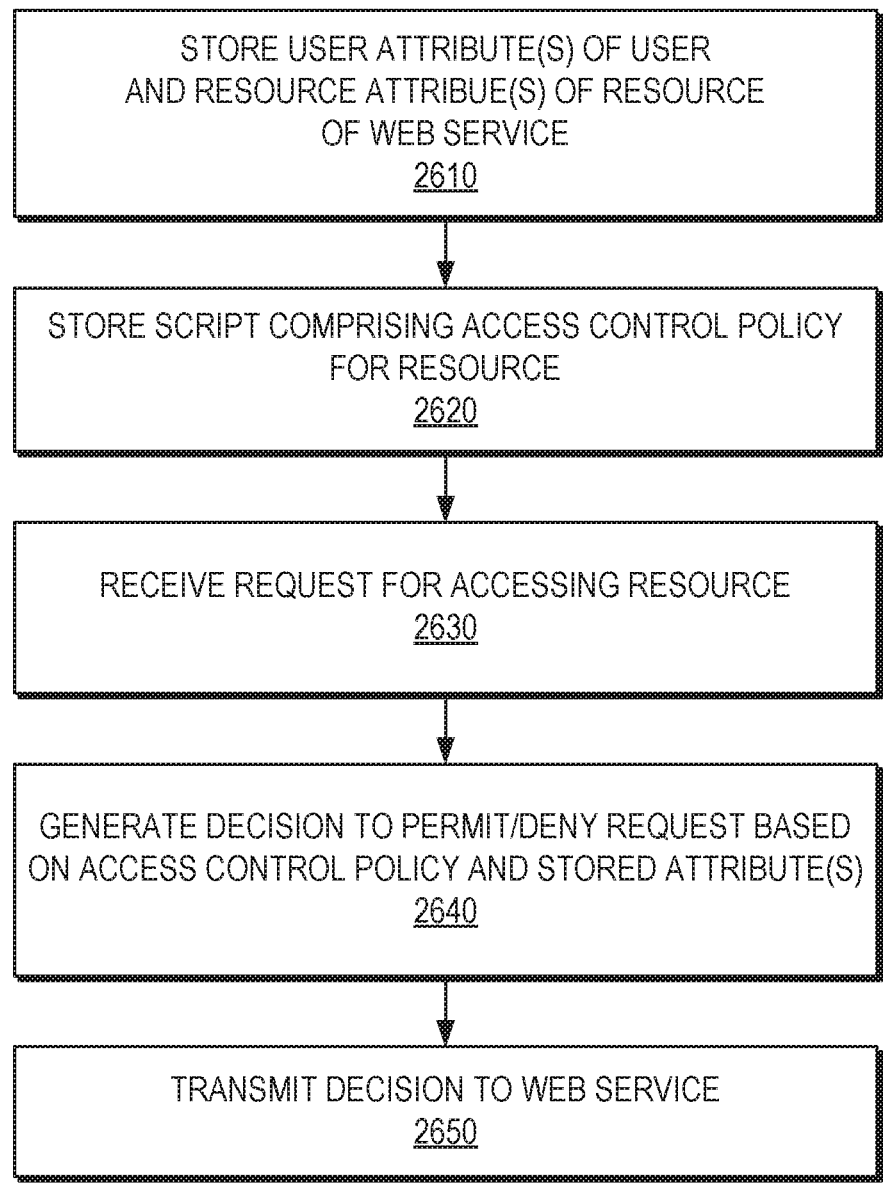
FIG. 26 is a flowchart illustrating a method, in accordance with some embodiments, of providing access control services.

FIG. 26 is a flowchart illustrating a method 2600, in accordance with some embodiments, of providing access control services. Method 2600 can be performed by processing logic that can comprise hardware (e.g., circuitry, dedicated logic, programmable logic, microcode, etc.), software (e.g., instructions run on a processing device), or a combination thereof. In one implementation, the method 2600 is performed by the cloud foundry layer 150 of FIG. 3, or any combination of one or more of its systems or modules (e.g., ACS system 340), as described above.

At operation 2610, a user attribute of a user and a resource attribute of a resource of a web service is stored in an attribute data store, with the user attribute comprising user information about the user other than an identification of the user, the resource attribute comprising resource information about the resource other than an identification of the resource, and the web service comprising a representational state transfer (RESTful) application programming interface (API). At operation 2620, a script comprising an access control policy for accessing the resource of the web service is stored in a policy data store, with the access control policy comprising at least one of the user attribute and the resource attribute. At operation 2630, a web service request for accessing the resource of the web service is received, with the web service request corresponding to the user and comprising an access token for the user, action data, and resource data, the action data comprising an identification of an action being requested to be applied to the resource, and the resource data comprising an identification of the resource. At operation 2640, a decision to either permit or deny the web service request is generated based on based on the access control policy, the retrieved user attribute, and the retrieved resource attribute, with the generating of the decision comprising interpreting the script. At operation 2650, the generated decision is transmitted to the web service.

It is contemplated that any of the other features described within the present disclosure can be incorporated into method 2600.

Figure 27:
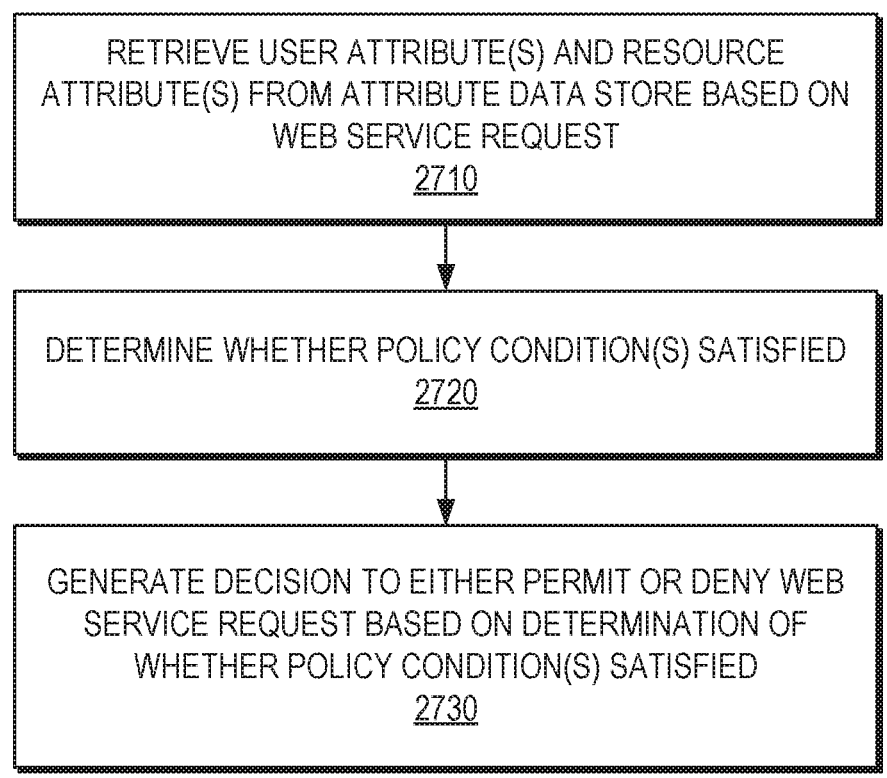
FIG. 27 is a flowchart illustrating a method, in accordance with some embodiments, of generating a decision to either permit or deny a web service request.

FIG. 27 is a flowchart illustrating a method 2700, in accordance with some embodiments, of generating a decision to either permit or deny a web service request. Method 2700 can be performed by processing logic that can comprise hardware (e.g., circuitry, dedicated logic, programmable logic, microcode, etc.), software (e.g., instructions run on a processing device), or a combination thereof. In one implementation, the method 2700 is performed by the cloud foundry layer 150 of FIG. 3, or any combination of one or more of its systems or modules (e.g., ACS system 340), as described above.

At operation 2710, the user attribute and the resource attribute are retrieved from the attribute data store based on the web service request. At operation 2720, it is determined whether the one or more policy conditions of the access control policy are satisfied based on the retrieved user attribute, the retrieved resource attribute, and the web service request. At operation 2730, the decision to either permit or deny the web service request is generated based on the determination of whether the one or more policy conditions of the access control policy are satisfied.

It is contemplated that any of the other features described within the present disclosure can be incorporated into method 2700.

Figure 28:
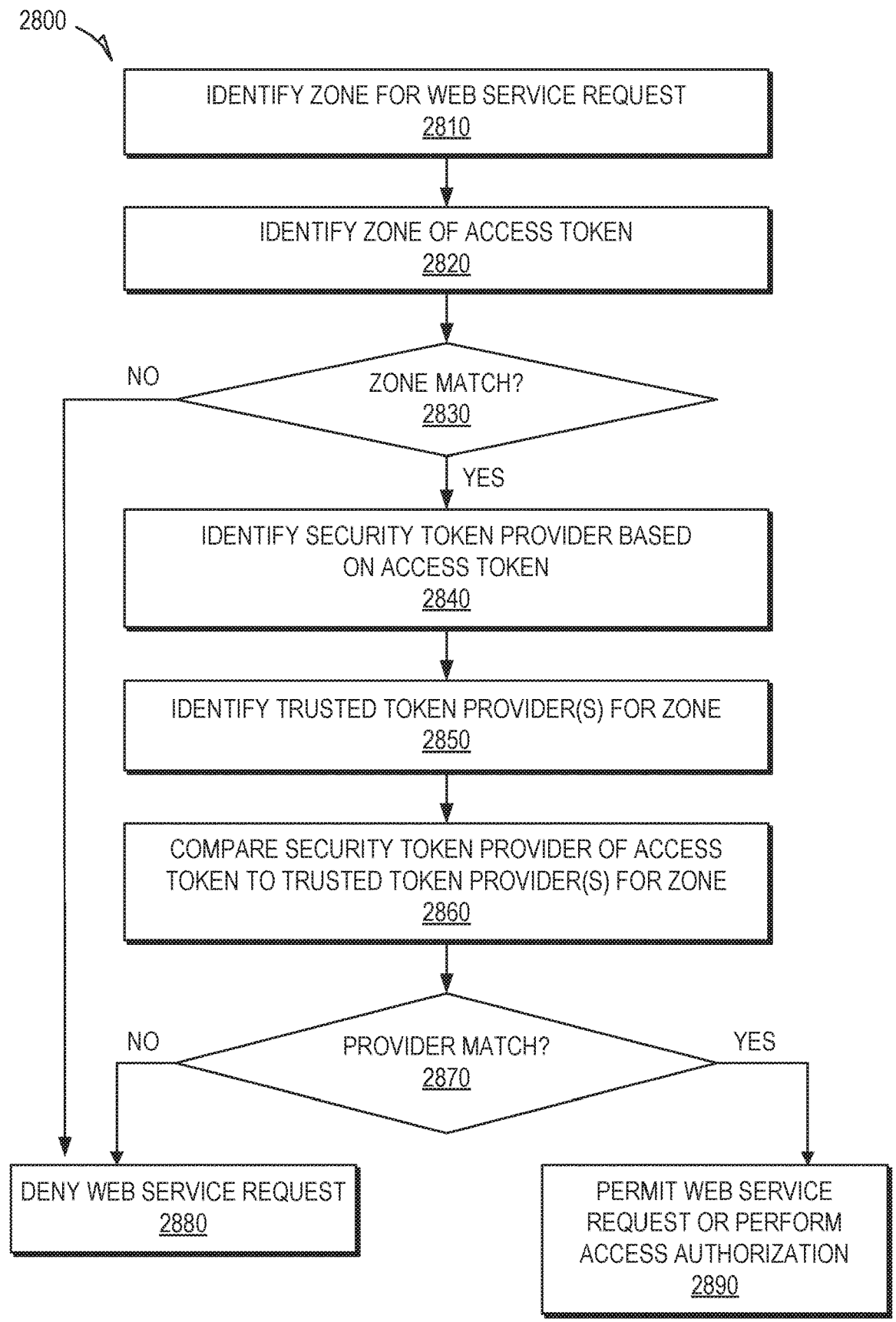
FIG. 28 is a flowchart illustrating a method, in accordance with some embodiments, of providing zone access control.

FIG. 28 is a flowchart illustrating a method, in accordance with some embodiments, of providing zone access control. Method 2800 can be performed by processing logic that can comprise hardware (e.g., circuitry, dedicated logic, programmable logic, microcode, etc.), software (e.g., instructions run on a processing device), or a combination thereof. In one implementation, the method 2700 is performed by the cloud foundry layer 150 of FIG. 3, or any combination of one or more of its systems or modules (e.g., ACS system 340), as described above.

At operation 2810, a zone for a web service request is identified. The zone can be identified based on a determination of the corresponding zone for an instance of the service or resource for which access is being requested. This determination can be made based on a retrieval of the corresponding zone from a table, such as table 1400, stored in a database. At operation 2820, a zone of the corresponding access token of the web service request is identified. At operation 2830, the zone for the web service request is compared with the zone of the access token, and it is determined whether or not the zones match. If it is determined that the zones do not match, then the web service request can be denied at operation 2880. If it is determined that the zones do match, then the method 2800 can proceed to operation 2840, where the security token provider that issued the access token is determined, such as by extracting the identification of the security token provider from the access token. At operation 2850, one or more trusted token providers for the zone of the web service request are identified, such as by retrieving the corresponding trusted token provider(s) for the zone from a table, such as table 1400, stored in a database. At operation 2860, the security token provider of the access token is compared with the trusted token provider(s) for the zone, and it is determined whether or not the security token provider of the access token matches any of the trusted token providers for the zone, at operation 2870.

If it is determined, at operation 2870, that the token providers do not match, then the web service request is denied, at operation 2880. In some example embodiments, the web service request is denied at operation 2880 without an access authorization process ever having been performed for the web service request (e.g., the access authorization process of FIG. 26 can be blocked or otherwise prevented from being performed for the web service request).

If it is determined, at operation 2870, that the token providers do match, then the web service request can be permitted or otherwise granted, at operation 2890. Alternatively, at operation 2890, an access authorization process (e.g., the access authorization process of FIG. 26) is performed in response to, or otherwise based on, the determination of a provider match at operation 2870. In this respect, the zone access control method 2800 of FIG. 28 can act as a filter for the access authorization process of FIG. 26, eliminating web requests that are either for an unauthorized or otherwise inappropriate zone or for that do not include an access token that has been issued by the appropriate trusted provider for the zone for which access is being requested.

It is contemplated that any of the other features described within the present disclosure can be incorporated into method 2800.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-17 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 29:
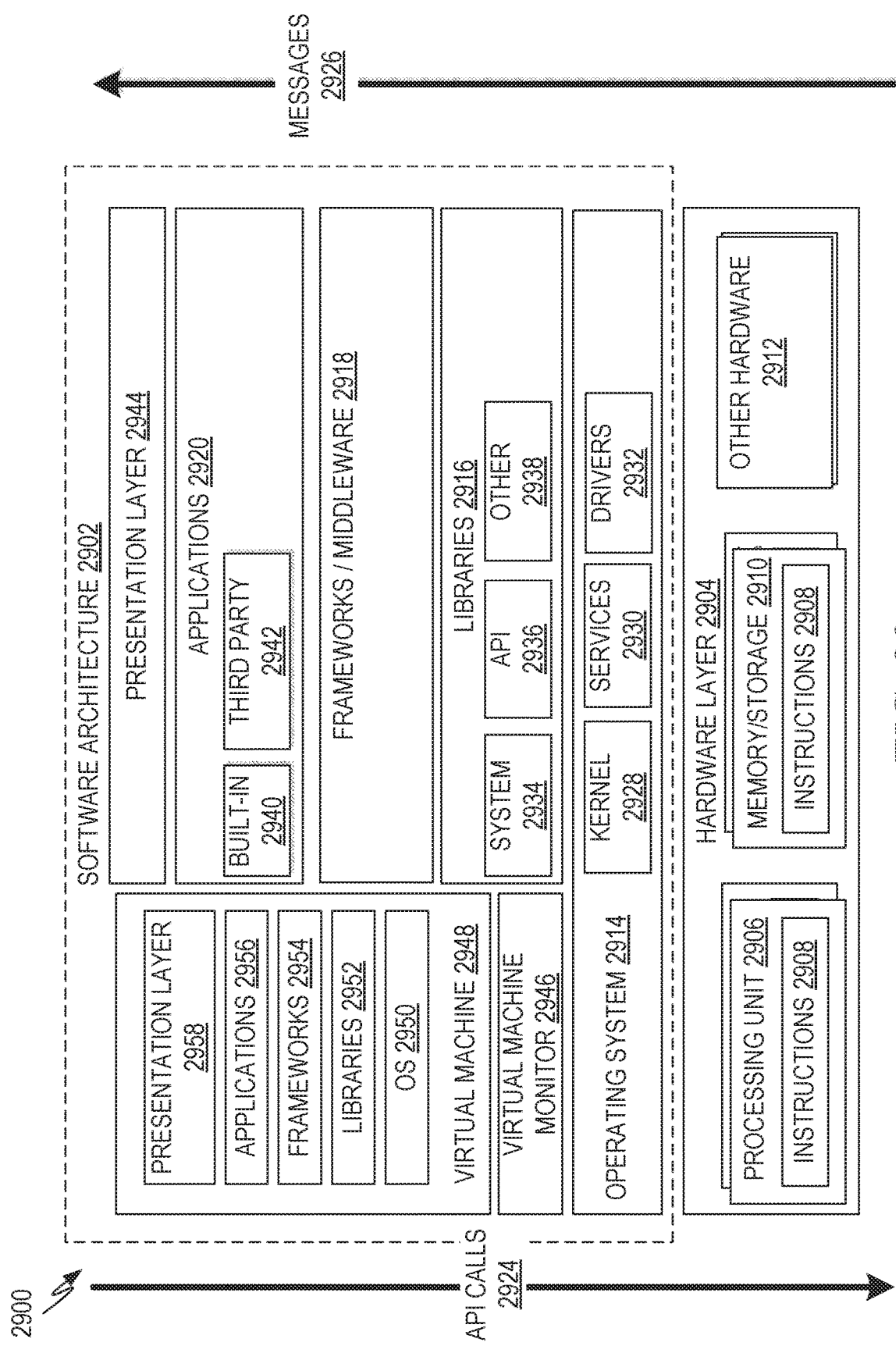
FIG. 29 is a block diagram illustrating a representative software architecture which may be used in conjunction with various hardware architectures herein described, in accordance with some example embodiments.

FIG. 29 is a block diagram 2900 illustrating a representative software architecture 2902, which may be used in conjunction with various hardware architectures herein described. FIG. 29 is merely a non-limiting example of a software architecture 2902, and it will be appreciated that many other architectures may be implemented to facilitate the functionality described herein. The software architecture 2902 may be executing on hardware such as a machine 1900 of FIG. 19 that includes, among other things, processors 1910, memory/storage 1930, and I/O components 1950. A representative hardware layer 2904 is illustrated and can represent, for example, the machine 1900 of FIG. 19. The representative hardware layer 2904 comprises one or more processing units 2906 having associated executable instructions 2908. The executable instructions 2908 represent the executable instructions of the software architecture 2902, including implementation of the methods, modules, and so forth of FIGS. 1-7. The hardware layer 2904 also includes memory and/or storage modules 2910, which also have the executable instructions 2908. The hardware layer 2904 may also comprise other hardware 2912, which represents any other hardware of the hardware layer 2904, such as the other hardware illustrated as part of the machine 1900.

In the example architecture of FIG. 29, the software architecture 2902 may be conceptualized as a stack of layers where each layer provides particular functionality. For example, the software architecture 2902 may include layers such as an operating system 2914, libraries 2916, frameworks/middleware 2918, applications 2920, and a presentation layer 2944. Operationally, the applications 2920 and/or other components within the layers may invoke API calls 2924 through the software stack and receive a response, returned values, and so forth illustrated as messages 2926 in response to the API calls 2924. The layers illustrated are representative in nature, and not all software architectures have all layers. For example, some mobile or special purpose operating systems may not provide a frameworks/middleware 2918, while others may provide such a layer. Other software architectures may include additional or different layers.

The operating system 2914 may manage hardware resources and provide common services. The operating system 2914 may include, for example, a kernel 2928, services 2930, and drivers 2932. The kernel 2928 may act as an abstraction layer between the hardware and the other software layers. For example, the kernel 2928 may be responsible for memory management, processor management (e.g., scheduling), component management, networking, security settings, and so on. The services 2930 may provide other common services for the other software layers. The drivers 2932 may be responsible for controlling or interfacing with the underlying hardware. For instance, the drivers 2932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 2916 may provide a common infrastructure that may be utilized by the applications 2920 and/or other components and/or layers. The libraries 2916 typically provide functionality that allows other software modules to perform tasks in an easier fashion than to interface directly with the underlying operating system 2914 functionality (e.g., kernel 2928, services 2930, and/or drivers 2932). The libraries 2916 may include system libraries 2934 (e.g., C standard library) that may provide functions such as memory allocation functions, string manipulation functions, mathematic functions, and the like. In addition, the libraries 2916 may include API libraries 2936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 2916 may also include a wide variety of other libraries 2938 to provide many other APIs to the applications 2920 and other software components/modules.

The frameworks/middleware 2918 may provide a higher-level common infrastructure that may be utilized by the applications 2920 and/or other software components/modules. For example, the frameworks/middleware 2918 may provide various graphic user interface (GUI) functions, high-level resource management, high-level location services, and so forth. The frameworks/middleware 2918 may provide a broad spectrum of other APIs that may be utilized by the applications 2920 and/or other software components/modules, some of which may be specific to a particular operating system or platform.

The applications 2920 include built-in applications 2940 and/or third-party applications 2942. Examples of representative built-in applications 2940 may include, but are not limited to, a contacts application, a browser application, a book reader application, a location application, a media application, a messaging application, and/or a game application. Third-party applications 2942 may include any of the built-in applications 2940 as well as a broad assortment of other applications. In a specific example, the third-party application 2942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2942 may invoke the API calls 2924 provided by the mobile operating system such as the operating system 2914 to facilitate functionality described herein.

The applications 2920 may utilize built-in operating system functions (e.g., kernel 2928, services 2930, and/or drivers 2932), libraries (e.g., system libraries 2934, API libraries 2936, and other libraries 2938), and frameworks/middleware 2918 to create user interfaces to interact with users of the system. Alternatively, or additionally, in some systems, interactions with a user may occur through a presentation layer, such as the presentation layer 2944. In these systems, the application/module "logic" can be separated from the aspects of the application/module that interact with a user.

Some software architectures utilize virtual machines. In the example of FIG. 29, this is illustrated by a virtual machine 2948. A virtual machine creates a software environment where applications/modules can execute as if they were executing on a hardware machine (such as the machine 1900 of FIG. 19, for example). The virtual machine 2948 is hosted by a host operating system (operating system 2914 in FIG. 29) and typically, although not always, has a virtual machine monitor 2946, which manages the operation of the virtual machine 2948 as well as the interface with the host operating system (i.e., operating system 2914). A software architecture executes within the virtual machine 2948, such as an operating system 2950, libraries 2952, frameworks/middleware 2954, applications 2956, and/or a presentation layer 2958. These layers of software architecture executing within the virtual machine 2948 can be the same as corresponding layers previously described or may be different.

Example Machine Architecture and Machine-Readable Medium

Figure 30:
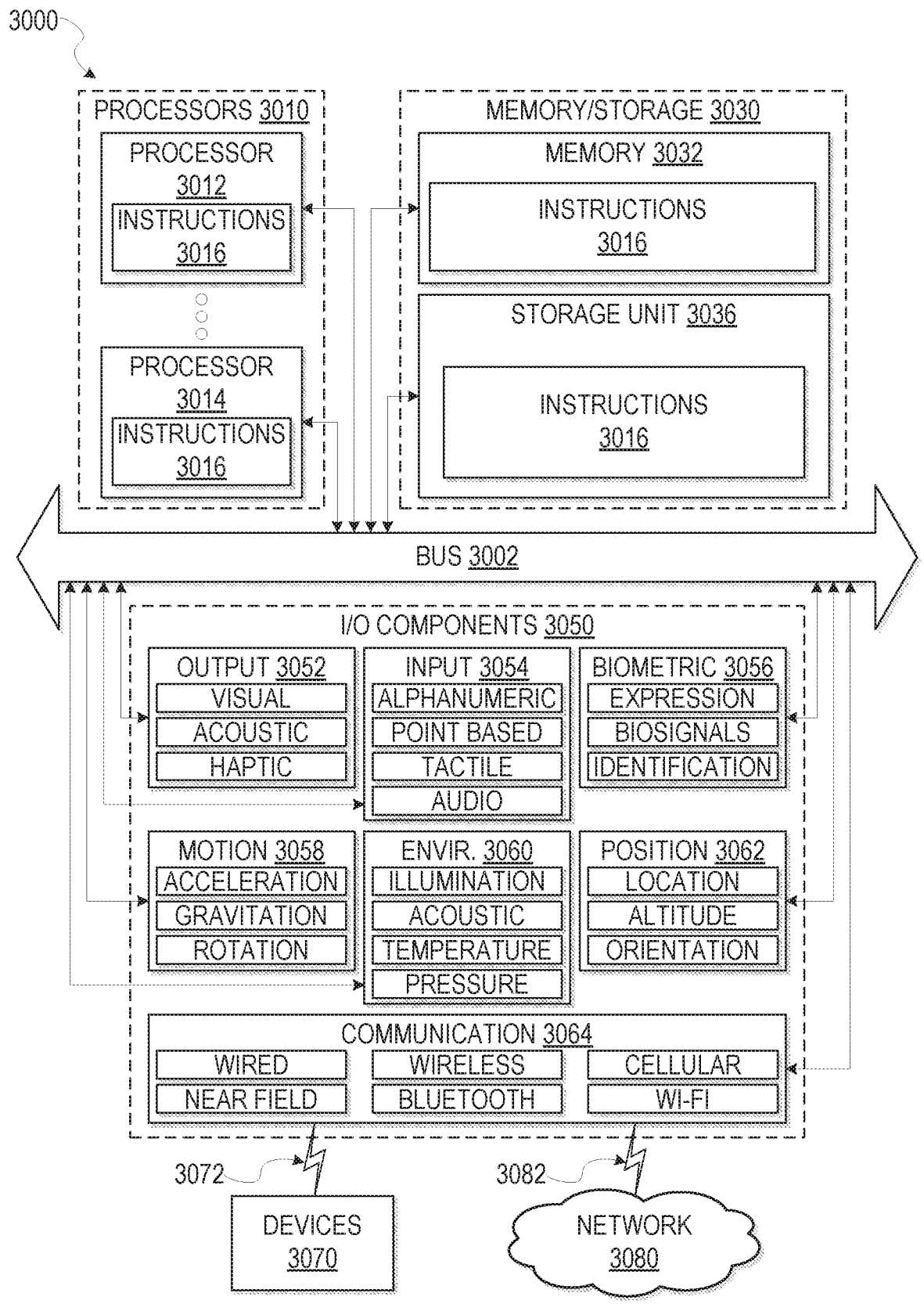
FIG. 30 is a block diagram illustrating components of a machine, according to some example embodiments, able to read instructions from a machine-readable medium (e.g., a machine-readable storage medium) and perform any one or more of the methodologies discussed herein.

FIG. 30 is a block diagram illustrating components of a machine 3000, according to some example embodiments, able to read instructions 3016 from a machine-readable medium (e.g., a machine-readable storage medium) and perform any one or more of the methodologies discussed herein. Specifically, FIG. 30 shows a diagrammatic representation of the machine 3000 in the example form of a computer system, within which the instructions 3016 (e.g., software, a program, an application, an applet, an app, or other executable code) for causing the machine 3000 to perform any one or more of the methodologies discussed herein may be executed. For example, the instructions 3016 may cause the machine 3000 to execute any one or more of the operations of FIGS. 1-28. Additionally, or alternatively, the instructions 3016 may implement any one or more of the modules or other components of FIGS. 1-4, 9, 10, and 13, and so forth. The instructions 3016 transform the general, non-programmed machine 3000 into a particular machine programmed to carry out the described and illustrated functions in the manner described. In alternative embodiments, the machine 3000 operates as a standalone device or may be coupled (e.g., networked) to other machines. In a networked deployment, the machine 3000 may operate in the capacity of a server machine or a client machine in a server-client network environment, or as a peer machine in a peer-to-peer (or distributed) network environment. The machine 3000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3016, sequentially or otherwise, that specify actions to be taken by the machine 3000. Further, while only a single machine 3000 is illustrated, the term "machine" shall also be taken to include a collection of machines 3000 that individually or jointly execute the instructions 3016 to perform any one or more of the methodologies discussed herein.

The machine 3000 may include processors 3010, memory/storage 3030, and I/O components 3050, which may be configured to communicate with each other such as via a bus 3002. In an example embodiment, the processors 3010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 3012 and a processor 3014 that may execute the instructions 3016. The term "processor" is intended to include a multi-core processor 3012, 3014 that may comprise two or more independent processors 3012, 3014 (sometimes referred to as "cores") that may execute the instructions 3016 contemporaneously. Although FIG. 30 shows multiple processors 3010, the machine 3000 may include a single processor 3012, 3014 with a single core, a single processor 3012, 3014 with multiple cores (e.g., a multi-core processor 3012, 3014), multiple processors 3012, 3014 with a single core, multiple processors 3012, 3014 with multiples cores, or any combination thereof.

The memory/storage 3030 may include a memory 3032, such as a main memory, or other memory storage, and a storage unit 3036, both accessible to the processors 3010 such as via the bus 3002. The storage unit 3036 and memory 3032 store the instructions 3016 embodying any one or more of the methodologies or functions described herein. The instructions 3016 may also reside, completely or partially, within the memory 3032, within the storage unit 3036, within at least one of the processors 3010 (e.g., within the cache memory of processor 3012, 3014), or any suitable combination thereof, during execution thereof by the machine 3000. Accordingly, the memory 3032, the storage unit 3036, and the memory of the processors 3010 are examples of machine-readable media.

As used herein, "machine-readable medium" means a device able to store the instructions 3016 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 3016. The term "machine-readable medium" shall also be taken to include any medium, or combination of multiple media, that is capable of storing instructions (e.g., instructions 3016) for execution by a machine (e.g., machine 3000), such that the instructions 3016, when executed by one or more processors of the machine 3000 (e.g., processors 3010), cause the machine 3000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 3050 may include a wide variety of components to receive input, provide output, produce output, transmit information, exchange information, capture measurements, and so on. The specific I/O components 3050 that are included in a particular machine 3000 will depend on the type of machine 3000. For example, portable machines such as mobile phones will likely include a touch input device or other such input mechanisms, while a headless server machine will likely not include such a touch input device. It will be appreciated that the I/O components 3050 may include many other components that are not shown in FIG. 30. The I/O components 3050 are grouped according to functionality merely for simplifying the following discussion, and the grouping is in no way limiting. In various example embodiments, the I/O components 3050 may include output components 3052 and input components 3054. The output components 3052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 3054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 3050 may include biometric components 3056, motion components 3058, environmental components 3060, or position components 3062, among a wide array of other components. For example, the biometric components 3056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 3058 may include acceleration sensor components (e.g., accelerometer), gravitation sensor components, rotation sensor components (e.g., gyroscope), and so forth. The environmental components 3060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 3062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3050 may include communication components 3064 operable to couple the machine 3000 to a network 3080 or devices 3070 via a coupling 3082 and a coupling 3072 respectively. For example, the communication components 3064 may include a network interface component or other suitable device to interface with the network 3080. In further examples, the communication components 3064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 3070 may be another machine or any of a wide variety of peripheral devices (e.g., a peripheral device coupled via a USB).

Moreover, the communication components 3064 may detect identifiers or include components operable to detect identifiers. For example, the communication components 3064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 3080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 3080 or a portion of the network 3080 may include a wireless or cellular network and the coupling 3082 may be a Code Division Multiple Access (CDMA) connection, a Global System for Mobile communications (GSM) connection, or another type of cellular or wireless coupling. In this example, the coupling 3082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 3016 may be transmitted or received over the network 3080 using a transmission medium via a network interface device (e.g., a network interface component included in the communication components 3064) and utilizing any one of a number of well-known transfer protocols (e.g., hypertext transfer protocol (HTTP)). Similarly, the instructions 3016 may be transmitted or received using a transmission medium via the coupling 3072 (e.g., a peer-to-peer coupling) to the devices 3070. The term "transmission medium" shall be taken to include any intangible medium that is capable of storing, encoding, or carrying the instructions 3016 for execution by the machine 3000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled. As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
storing, in one or more data stores, a user attribute of a user, a resource attribute of a resource of a web service, one or more scope conditions to be satisfied in order to apply one of the user attribute and the resource attribute in generating a decision of whether to permit or deny an action, and a script comprising an access control policy for accessing the resource of the web service, the user attribute comprising user information about the user other than an identification of the user, the resource attribute comprising resource information about the resource other than an identification of the resource, and the access control policy comprising one or more policy conditions to be satisfied in order to permit the action, the one or more policy conditions comprising at least one of the user attribute and the resource attribute;
wherein the user attribute, resource attribute, and the one or more scope conditions are stored in a tree data structure that is separate from the script;
receiving a web service request for accessing the resource of the web service, the web service request corresponding to the user and comprising an access token for the user, action data identifying the action being requested to be applied to the resource, and resource data identifying the resource;
determining that the one or more scope conditions are satisfied for the web service request by traversing the tree data structure;
generating, by a machine having a memory and at least one processor, a decision to either permit or deny the web service request based on the access control policy, the one of the stored user attribute and the stored resource attribute being used in generating the decision based on the determination that the one or more scope conditions are satisfied, and the generating of the decision comprising interpreting the script; and transmitting the decision to the web service;

wherein the resource attribute comprises an organization associated with the resource, a group associated with the resource, or a role associated with the resource;

wherein when the resource is accessed in response to the web service request, the web service utilizes the resource to build, test, or implement a first industrial internet application;

wherein placement of the scoped conditions in the data structure allows an administrator to set conditions for accessing a resource by configuring a user account rather than re-writing the access control policy in the script.

2. The computer-implemented method of claim 1, wherein:

the one of the user attribute and the resource attribute comprises the user attribute;

the one or more scope conditions comprises a restriction that the user attribute be associated with the user in generating the decision of whether to permit or deny the action only when the action involves one of a set of one or more particular resources; and the determining that the one or more scope conditions are satisfied for the web service request comprises determining that the resource of the web service request is one of the set of one or more particular resources.

3. The computer-implemented method of claim 1, wherein the one or more scope conditions are stored in a relationship with the one of the user attribute and the resource attribute in a graph data structure.

4. The computer-implemented method of claim 1, wherein the web service comprises a representational state transfer (RESTful) application programming interface (API).

5. The computer-implemented method of claim 1, wherein the script is included within a JavaScript Object Notation (JSON).

6. The computer-implemented method of claim 1, wherein transmitting the decision to the web service further comprises transmitting the stored user attribute and the stored resource attribute to the web service.

7. The computer-implemented method of claim 1, wherein the generating the decision to either permit or deny the web service request comprises:

retrieving the user attribute and the resource attribute from the attribute data store based on the web service request;

determining whether the one or more policy conditions of the access control policy are satisfied based on the retrieved user attribute, the retrieved resource attribute, and the web service request; and generating the decision to either permit or deny the web service request based on the determination of whether the one or more policy conditions of the access control policy are satisfied.

8. The computer-implemented method of claim 7, wherein the retrieving the user attribute from the attribute data store comprises extracting the user attribute based on the access token for the user.

9. The computer-implemented method of claim 1, wherein the action comprises a HyperText Transfer Protocol (HTTP) method.

10. The computer-implemented method of claim 1, wherein the resource data comprises a uniform resource identifier (URI) corresponding to the resource.

11. The computer-implemented method of claim 1, wherein the user attribute comprises an organization to which the user belongs, a group to which the user belongs, or a role of the user.

12. The computer-implemented method of claim 1, further comprising:

modifying the script in response to a user input, the modification of the script comprising a policy modification of the access control policy; and storing the modified script in the policy data store, wherein the generating the decision to either permit or deny the web service request comprises generating the decision to either permit or deny the web service request based on the modified access control policy, the retrieved user attribute, and the retrieved resource attribute, the generating of the decision comprising interpreting the modified script.

13. The computer-implemented method of claim 1, wherein the web service comprises a service in an Industrial Internet of Things (IIoT).

14. A system comprising:

at least one processor; and a non-transitory computer-readable medium storing executable instructions that, when executed, cause the at least one processor to perform operations comprising:

storing, in one or more data stores, a user attribute of a user, a resource attribute of a resource of a web service, one or more scope conditions to be satisfied in order to apply one of the user attribute and the resource attribute in generating a decision of whether to permit or deny an action, and a script comprising an access control policy for accessing the resource of the web service, the user attribute comprising user information about the user other than an identification of the user, the resource attribute comprising resource information about the resource other than an identification of the resource, and the access control policy comprising one or more policy conditions to be satisfied in order to permit the action, the one or more policy conditions comprising at least one of the user attribute and the resource attribute;

wherein the user attribute, resource attribute, and the one or more scope conditions are stored in a tree data structure that is separate from the script;

receiving a web service request for accessing the resource of the web service, the web service request corresponding to the user and comprising an access token for the user, action data identifying the action being requested to be applied to the resource, and resource data identifying the resource;

determining that the one or more scope conditions are satisfied for the web service request by traversing the tree data structure;

generating a decision to either permit or deny the web service request based on the access control policy, the one of the stored user attribute and the stored resource attribute being used in generating the decision based on the determination that the one or more scope conditions are satisfied, and the generating of the decision comprising interpreting the script;

transmitting the decision to the web service;

wherein the resource attribute comprises an organization associated with the resource, a group associated with the resource, or a role associated with the resource;

wherein when the resource is accessed in response to the web service request, the web service utilizes the resource to build, test, or implement a first industrial internet application;

wherein placement of the scoped conditions in the data structure allows an administrator to set conditions for accessing a resource by configuring a user account rather than re-writing the access control policy in the script.

15. The system of claim 14, wherein:

the one of the user attribute and the resource attribute comprises the user attribute;

the one or more scope conditions comprises a restriction that the user attribute be associated with the user in generating the decision of whether to permit or deny the action only when the action involves one of a set of one or more particular resources; and the determining that the one or more scope conditions are satisfied for the web service request comprises determining that the resource of the web service request is one of the set of one or more particular resources.

16. The system of claim 14, wherein the one or more scope conditions are stored in a relationship with the one of the user attribute and the resource attribute in a graph data structure.

17. The system of claim 14, wherein the web service comprises a representational state transfer (RESTful) application programming interface (API).

18. The system of claim 14, wherein the script is included within a JavaScript Object Notation (JSON).

19. A non-transitory machine-readable storage medium, tangibly embodying a set of instructions that, when executed by at least one processor, causes the at least one processor to perform operations comprising:

storing, in one or more data stores, a user attribute of a user, a resource attribute of a resource of a web service, one or more scope conditions to be satisfied in order to apply one of the user attribute and the resource attribute in generating a decision of whether to permit or deny an action, and a script comprising an access control policy for accessing the resource of the web service, the user attribute comprising user information about the user other than an identification of the user, the resource attribute comprising resource information about the resource other than an identification of the resource, and the access control policy comprising one or more policy conditions to be satisfied in order to permit the action, the one or more policy conditions comprising at least one of the user attribute and the resource attribute;

wherein the user attribute, resource attribute, and the one or more scope conditions are stored in a tree data structure that is separate from the script;

receiving a web service request for accessing the resource of the web service, the web service request corresponding to the user and comprising an access token for the user, action data identifying the action being requested to be applied to the resource, and resource data identifying the resource;

determining that the one or more scope conditions are satisfied for the web service request by traversing the tree data structure;

generating, by a machine having a memory and at least one processor, a decision to either permit or deny the web service request based on the access control policy, the one of the stored user attribute and the stored resource attribute being used in generating the decision based on the determination that the one or more scope conditions are satisfied, and the generating of the decision comprising interpreting the script; and transmitting the decision to the web service;

wherein the resource attribute comprises an organization associated with the resource, a group associated with the resource, or a role associated with the resource;

wherein when the resource is accessed in response to the web service request, the web service utilizes the resource to build, test, or implement a first industrial internet application;

wherein placement of the scoped conditions in the data structure allows an administrator to set conditions for accessing a resource by configuring a user account rather than re-writing the access control policy in the script.

\* \* \* \* \*